(12) United States Patent
Chang

(10) Patent No.: US 7,405,886 B2
(45) Date of Patent: Jul. 29, 2008

(54) ZOOM LENS DEVICE

(75) Inventor: Yu-Min Chang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 11/734,942

(22) Filed: Apr. 13, 2007

(65) Prior Publication Data

US 2008/0055738 A1 Mar. 6, 2008

(30) Foreign Application Priority Data

Aug. 31, 2006 (TW) .............................. 95132255 A

(51) Int. Cl.
*G02B 15/14* (2006.01)

(52) U.S. Cl. ..................................... 359/689; 359/686

(58) Field of Classification Search ................. 359/689, 359/686, 680, 782–784, 781, 770, 771
See application file for complete search history.

(56) References Cited

U.S. PATENT DOCUMENTS

| | | | |
|---|---|---|---|
| 6,259,508 B1 * | 7/2001 | Shigematsu | 355/53 |
| 7,113,346 B1 * | 9/2006 | Souma et al. | 359/687 |
| 7,126,759 B2 * | 10/2006 | Sensui | 359/680 |
| 7,167,320 B2 * | 1/2007 | Ohashi | 359/687 |

\* cited by examiner

*Primary Examiner*—Timothy J Thompson

(57) ABSTRACT

A zoom lens device includes, in sequence from an object side to an imaging side, a negative first lens group, a positive second lens group, and a positive third lens group. When the zoom lens device is moved from a wide-angle condition to a telephoto condition, the second lens group moves towards the object side while the first lens group moves firstly towards the imaging side and then towards the object side to thereby reducing the distance between the first and second lens groups. The third lens group moves only when the zoom lens devices focuses.

19 Claims, 30 Drawing Sheets

Wide-Angle

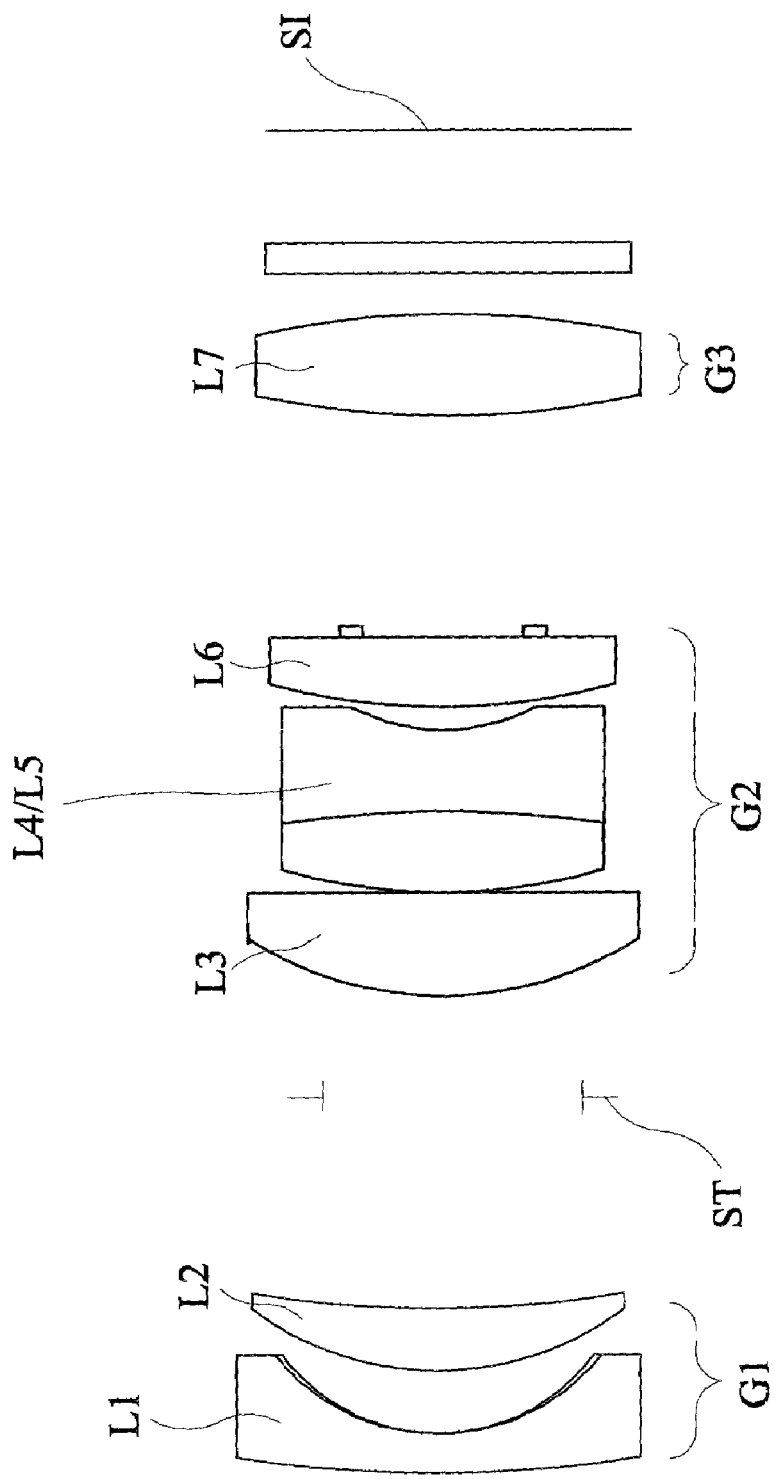
FIG. 2B Telephoto

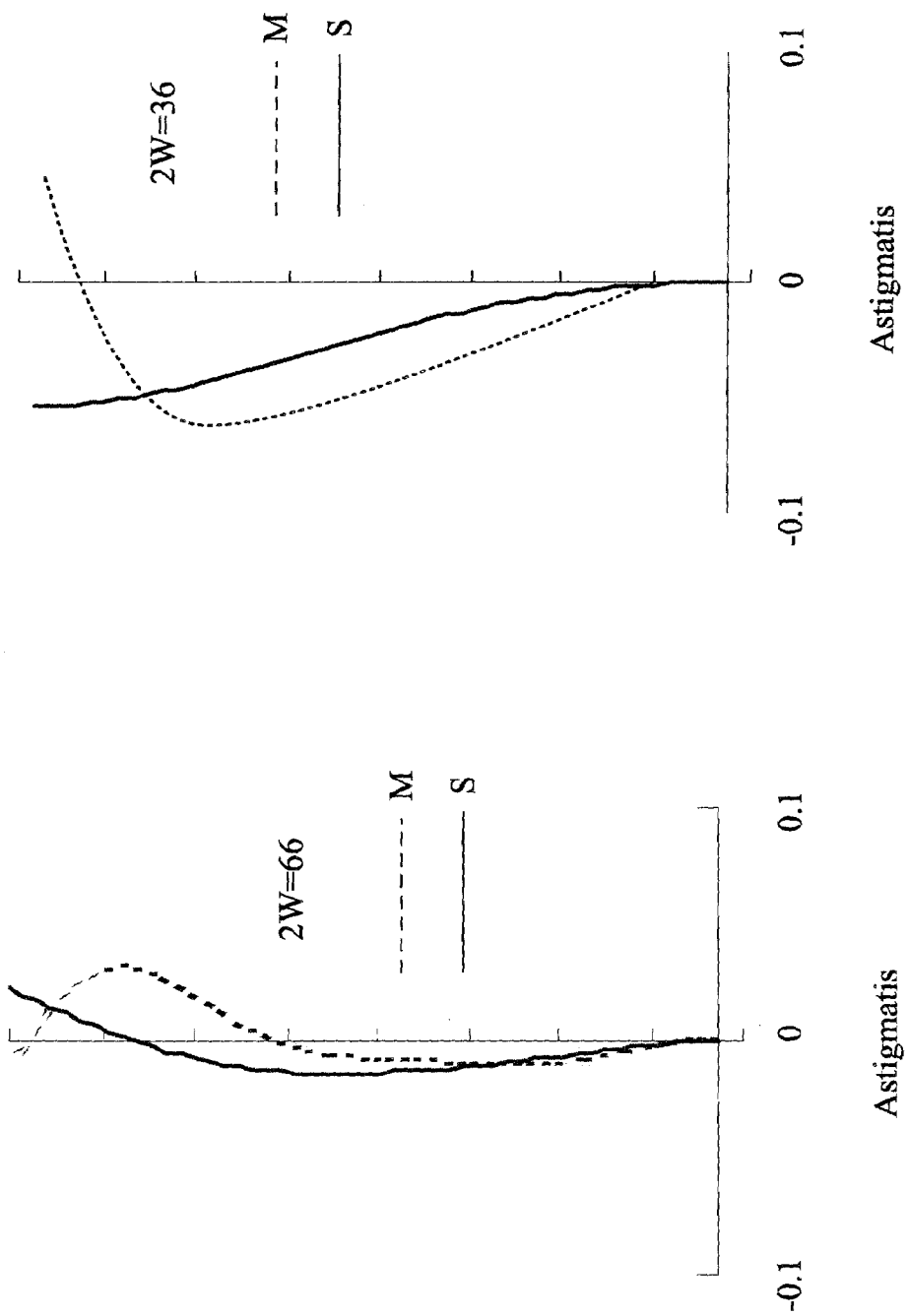

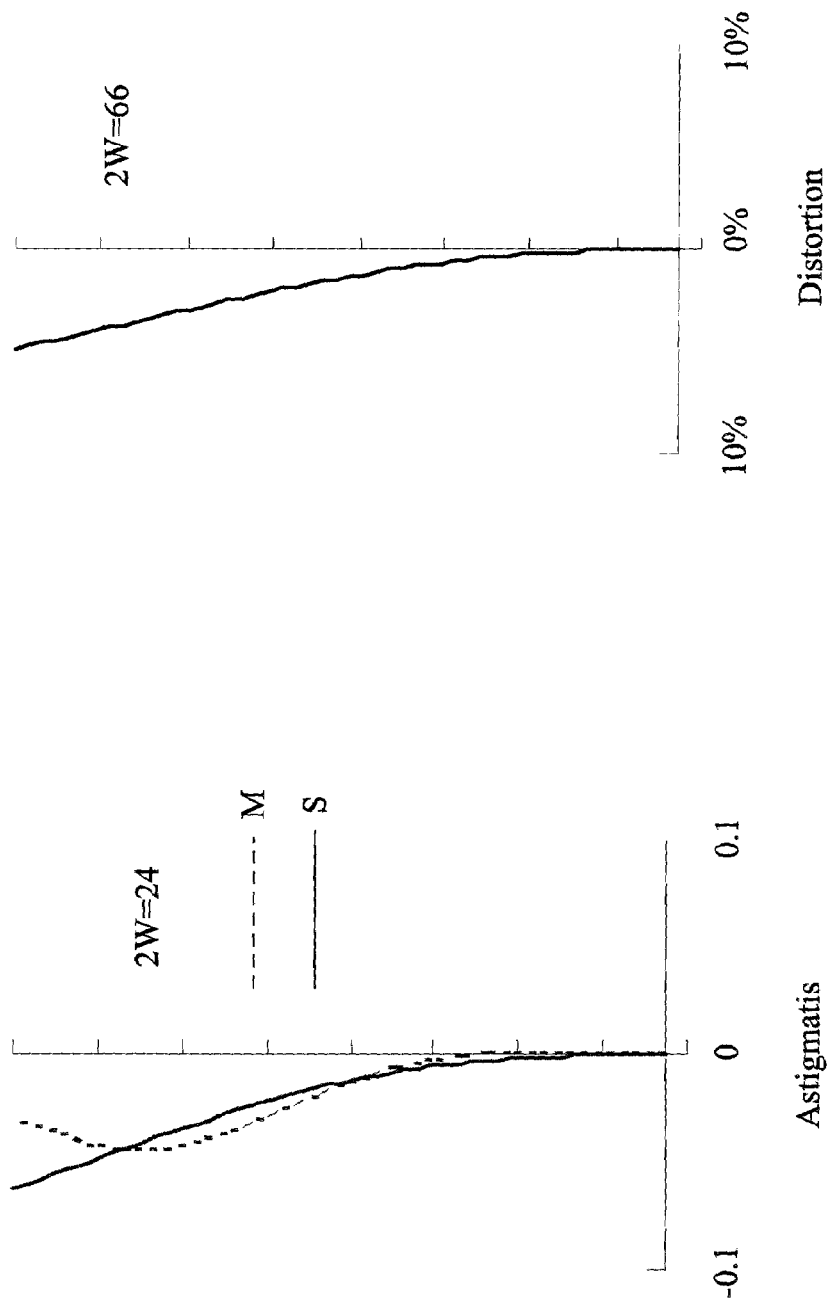

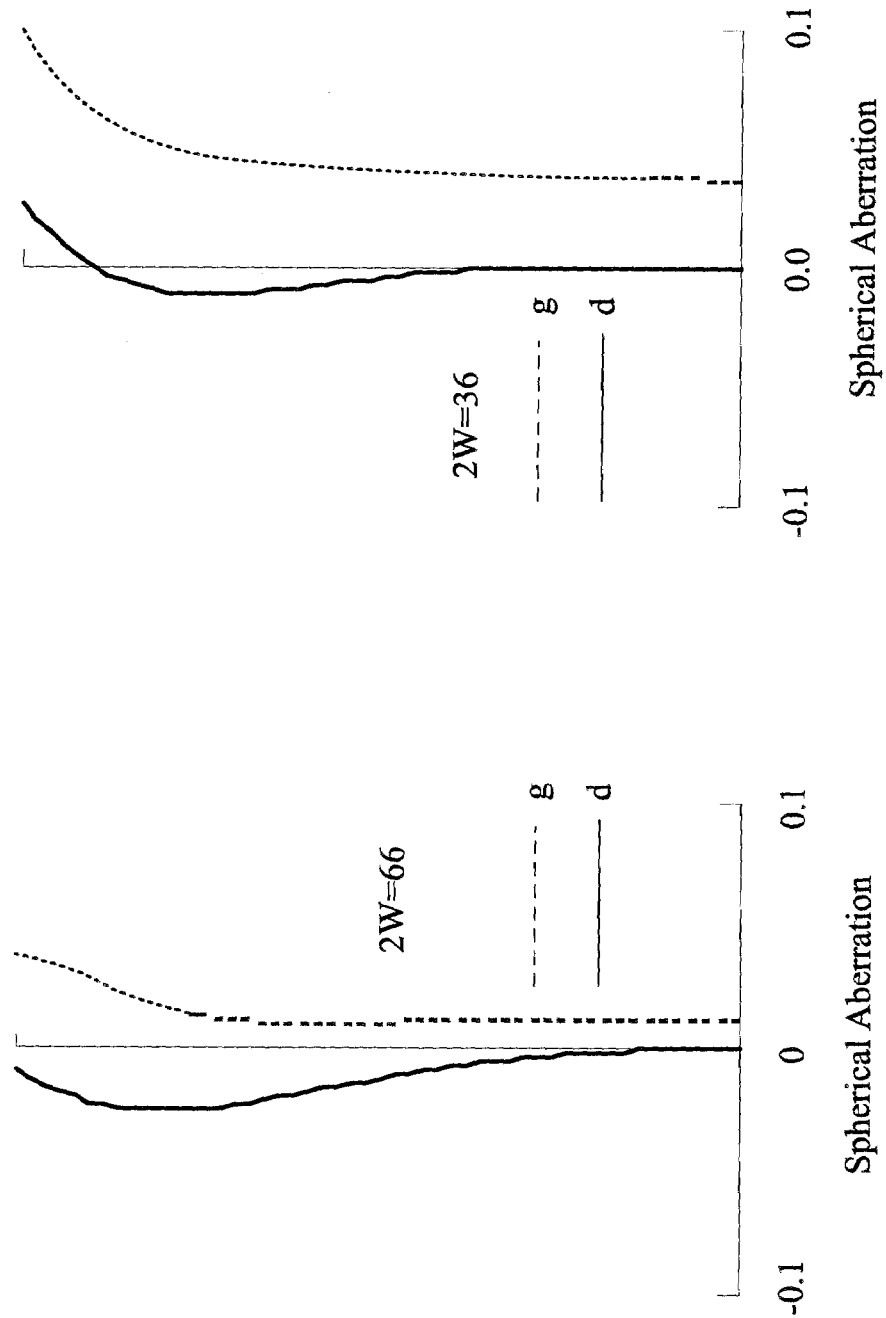

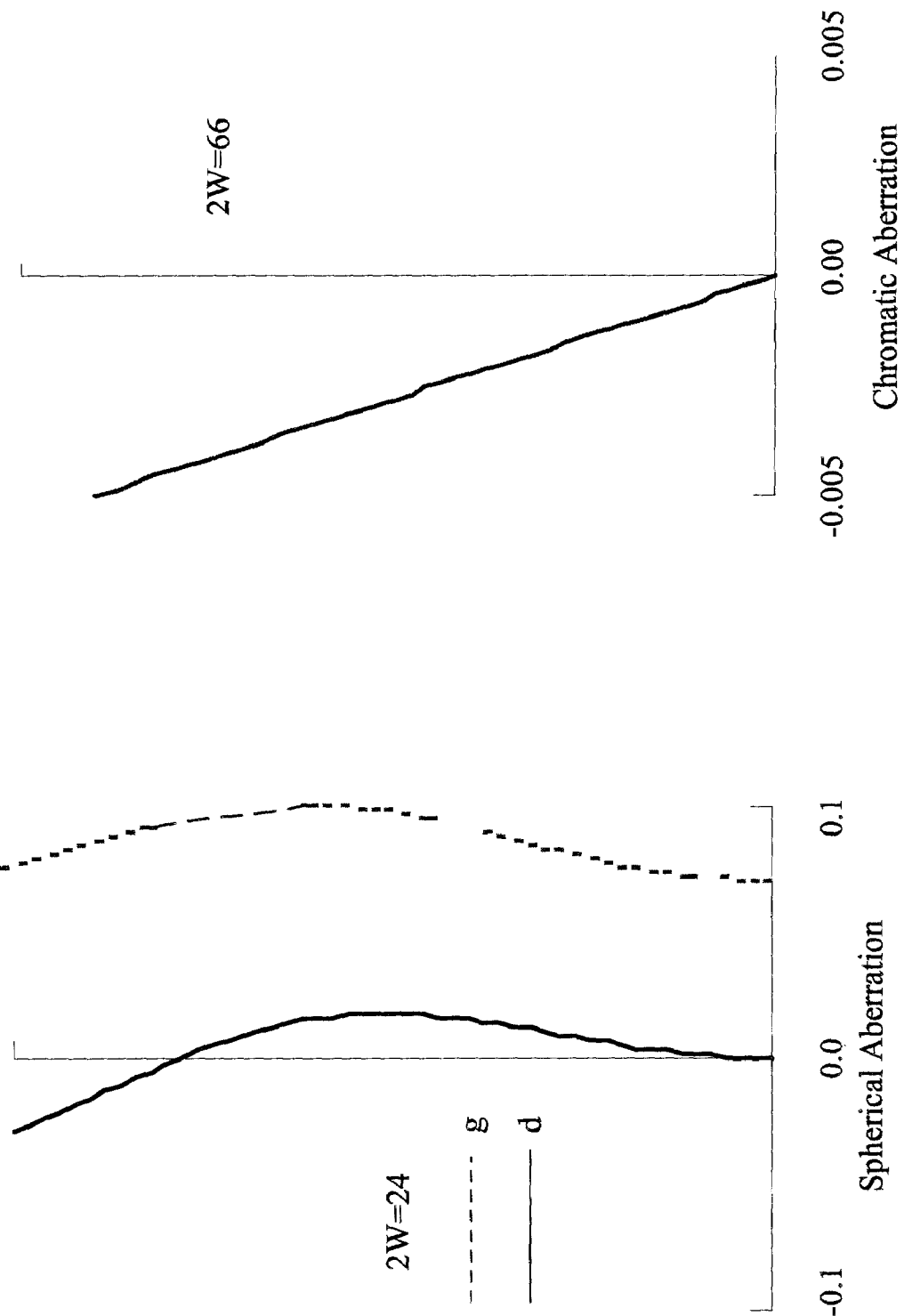

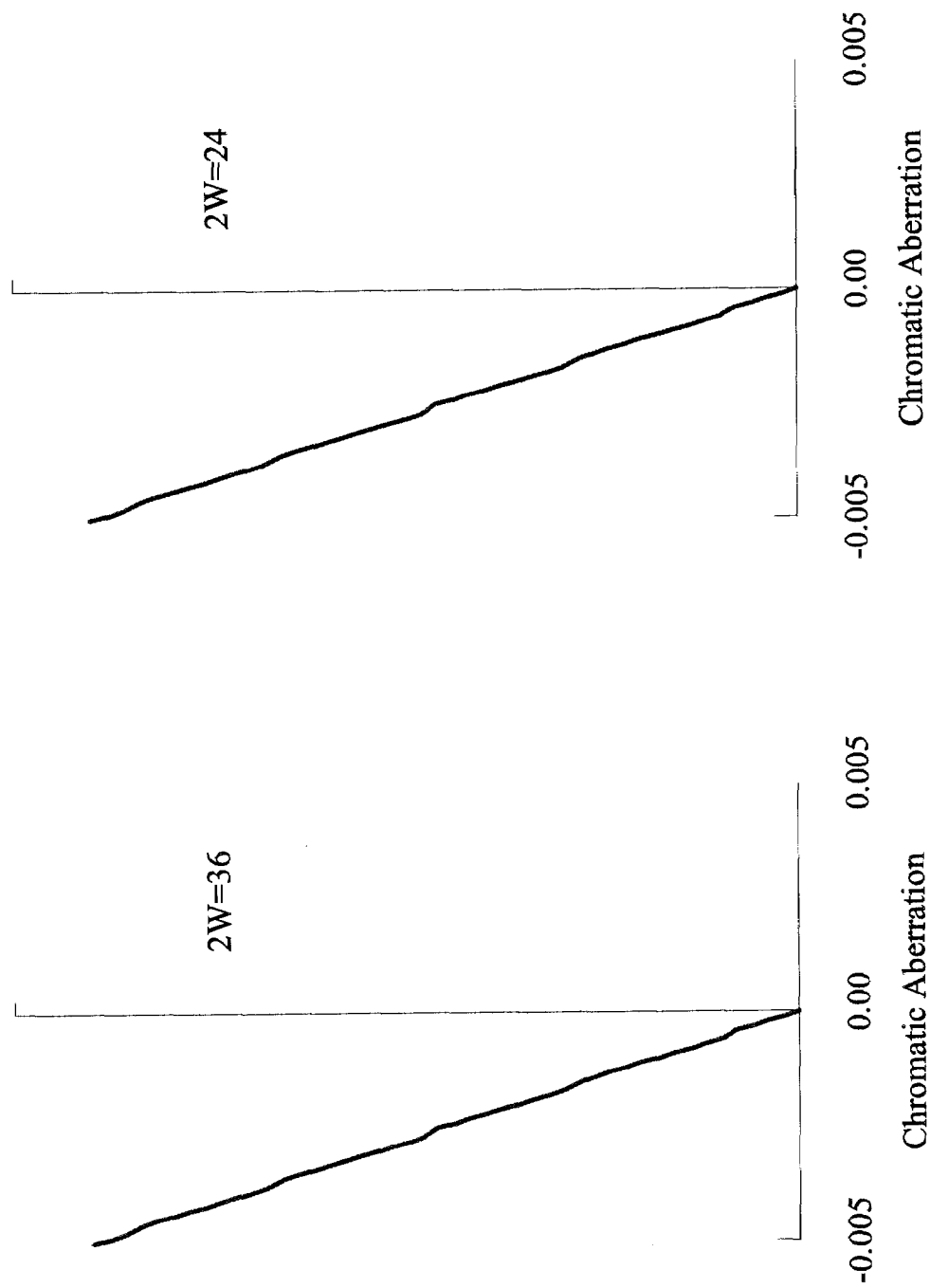

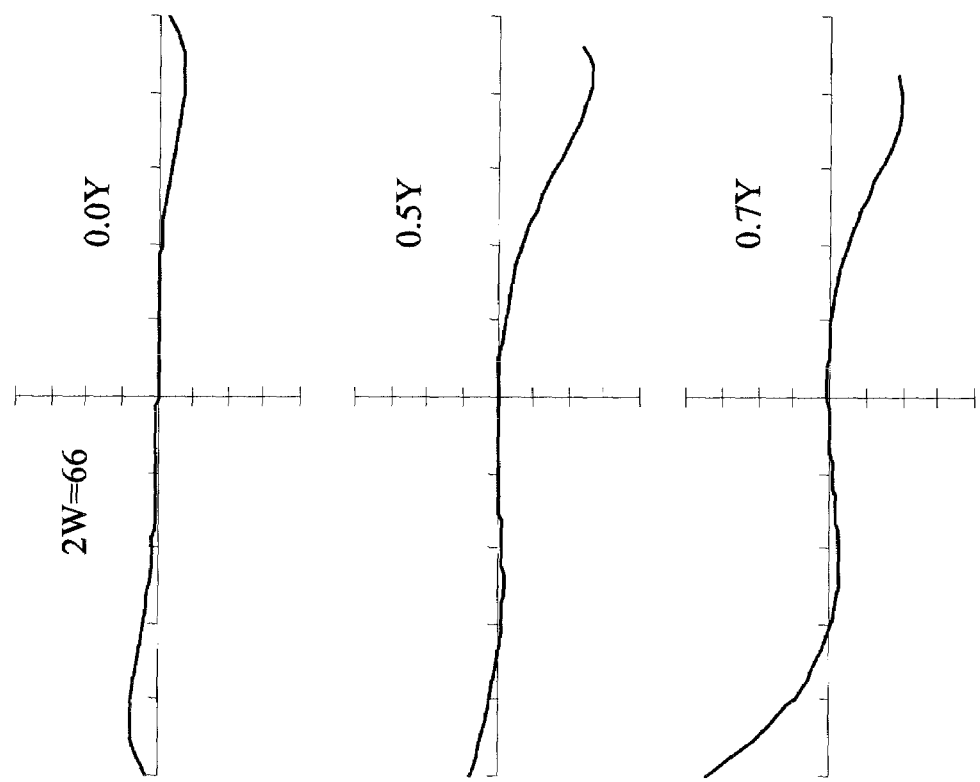

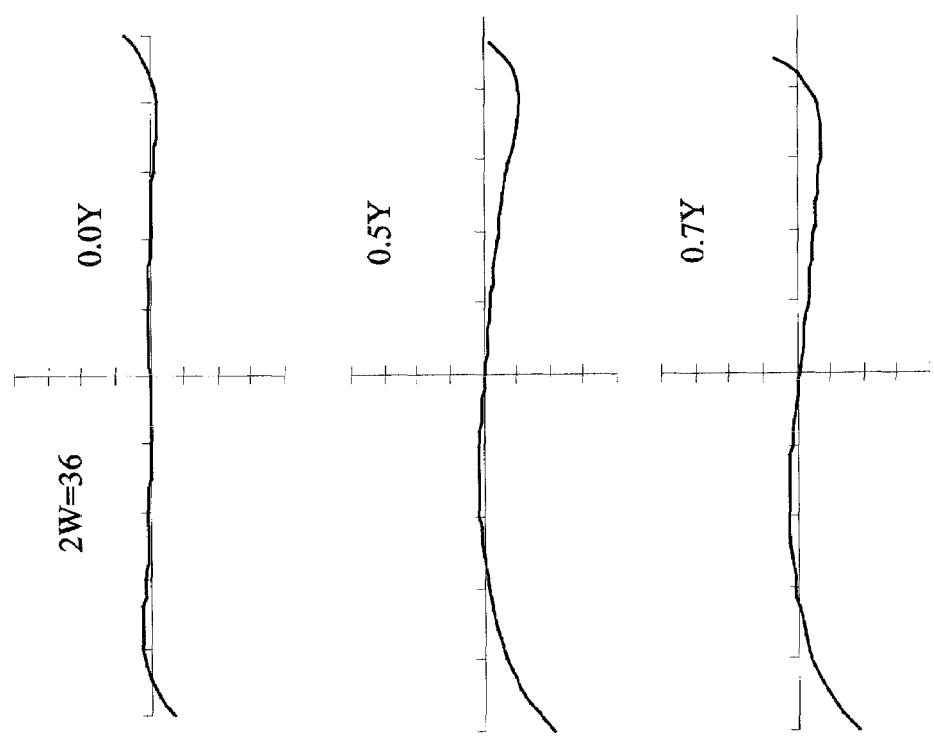
FIG. 7B Coma Aberration

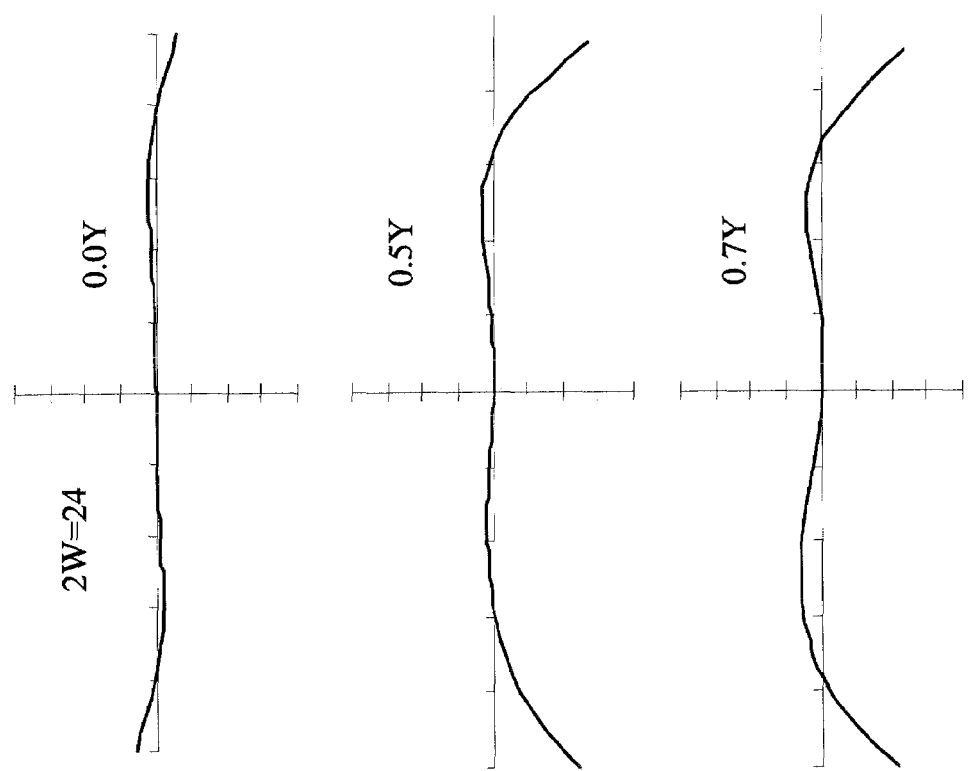

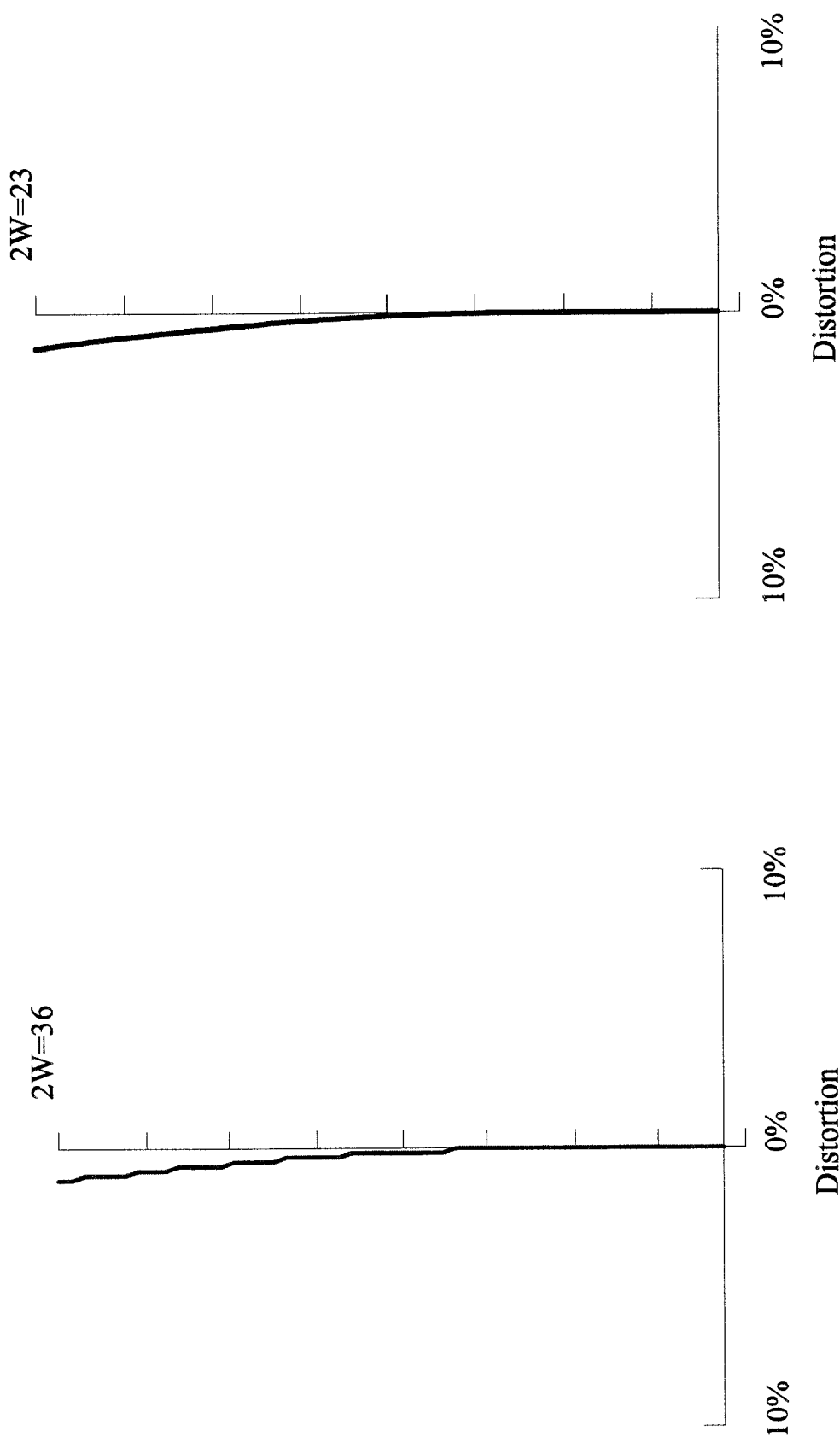

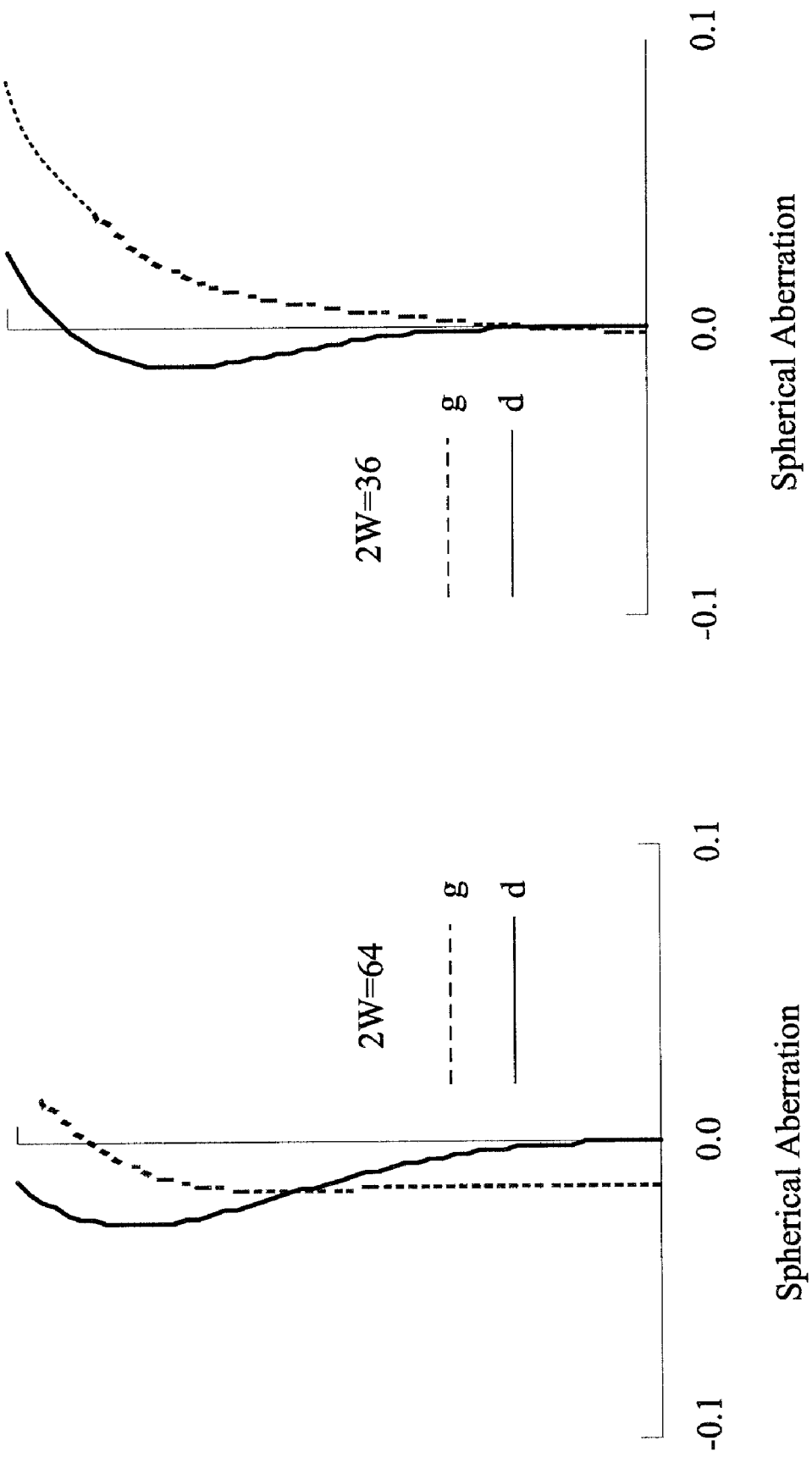

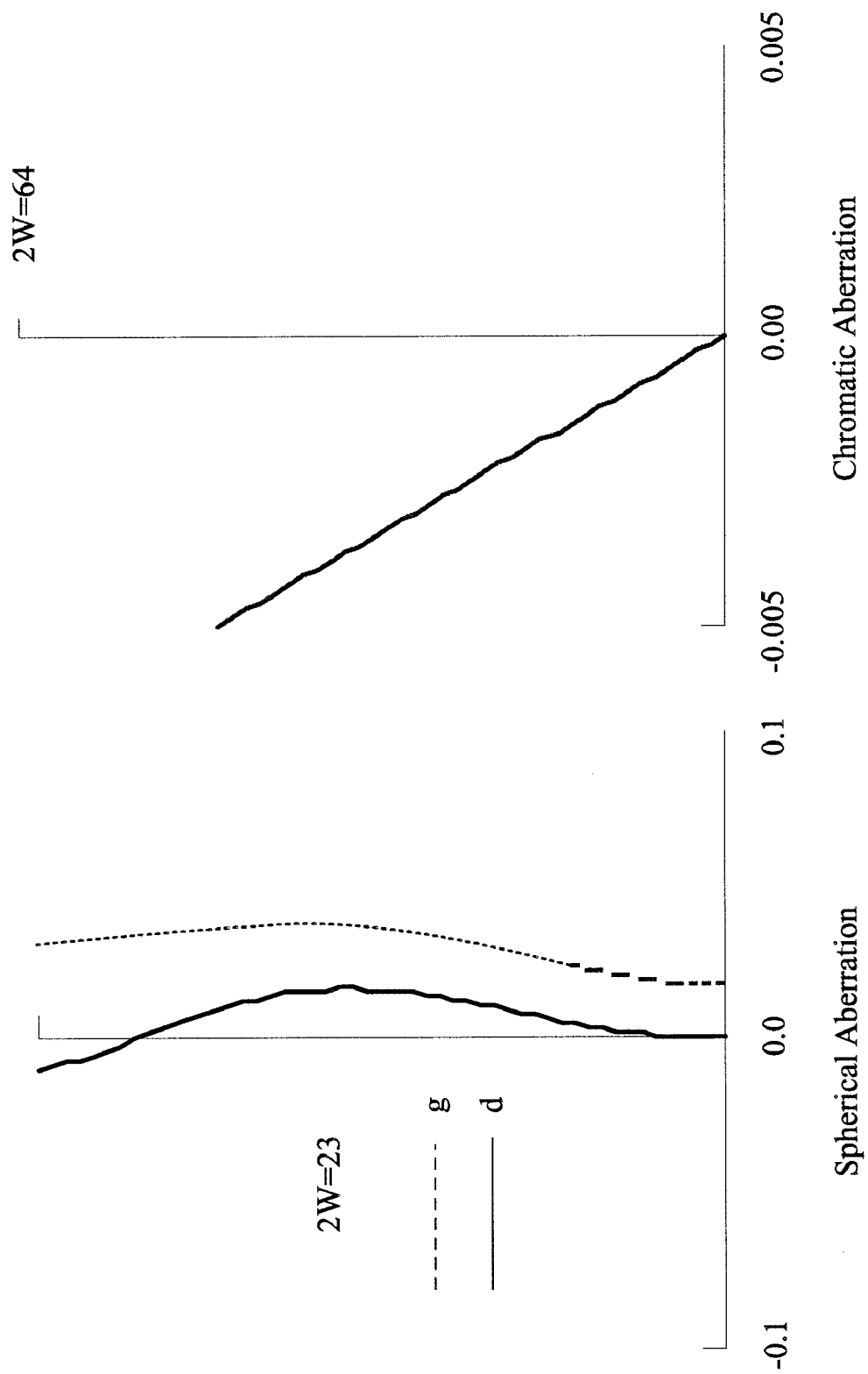

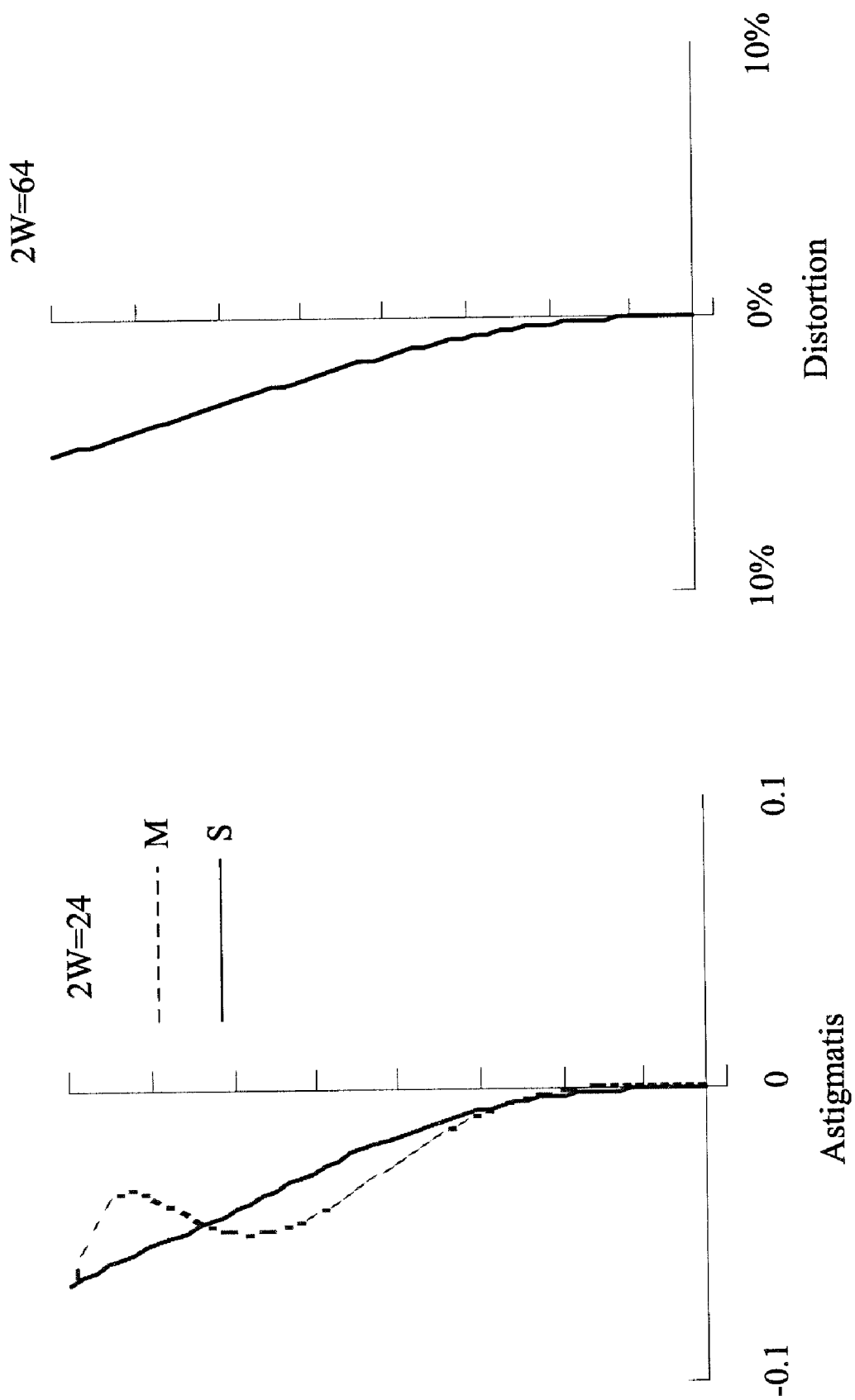

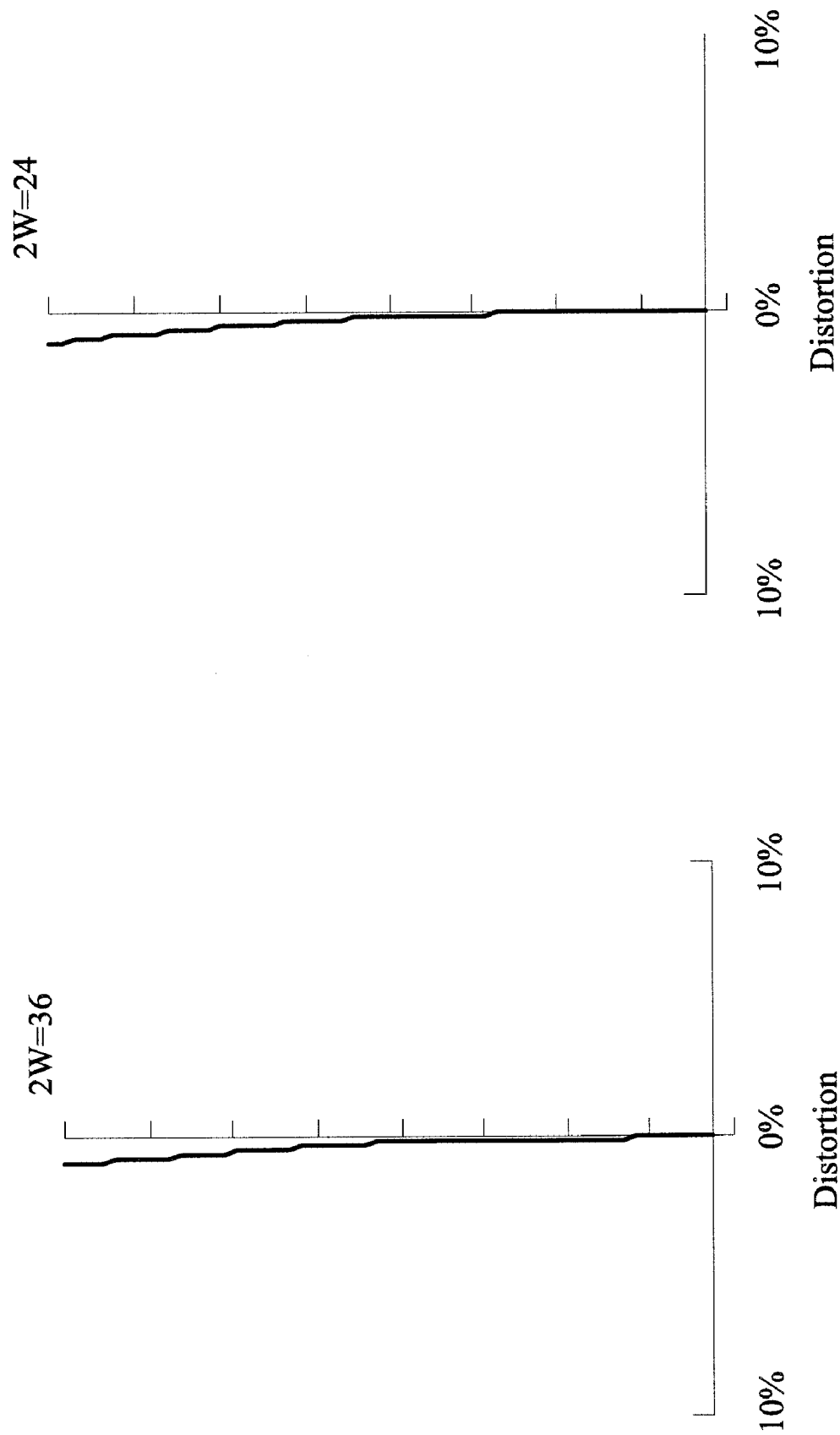

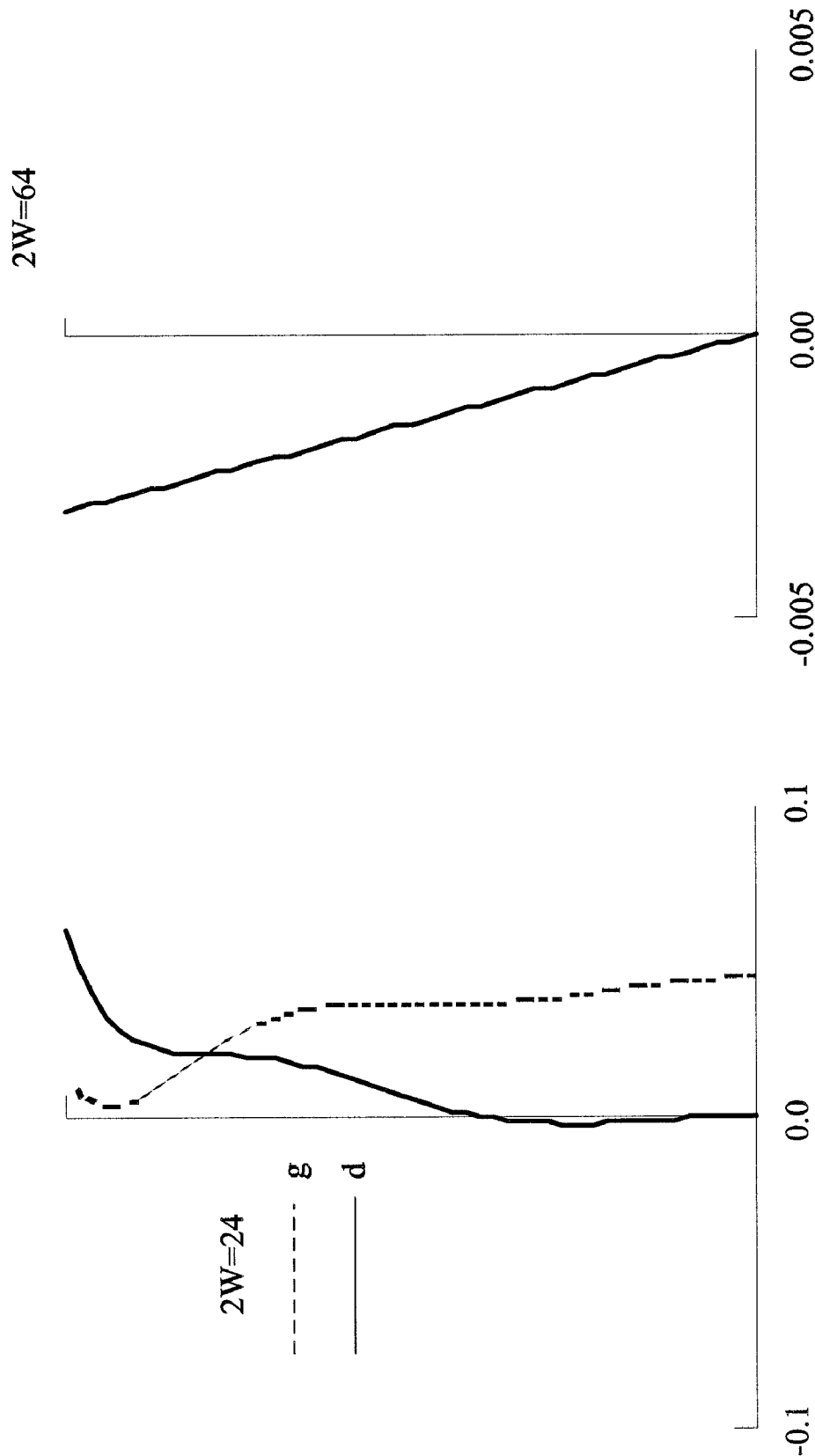

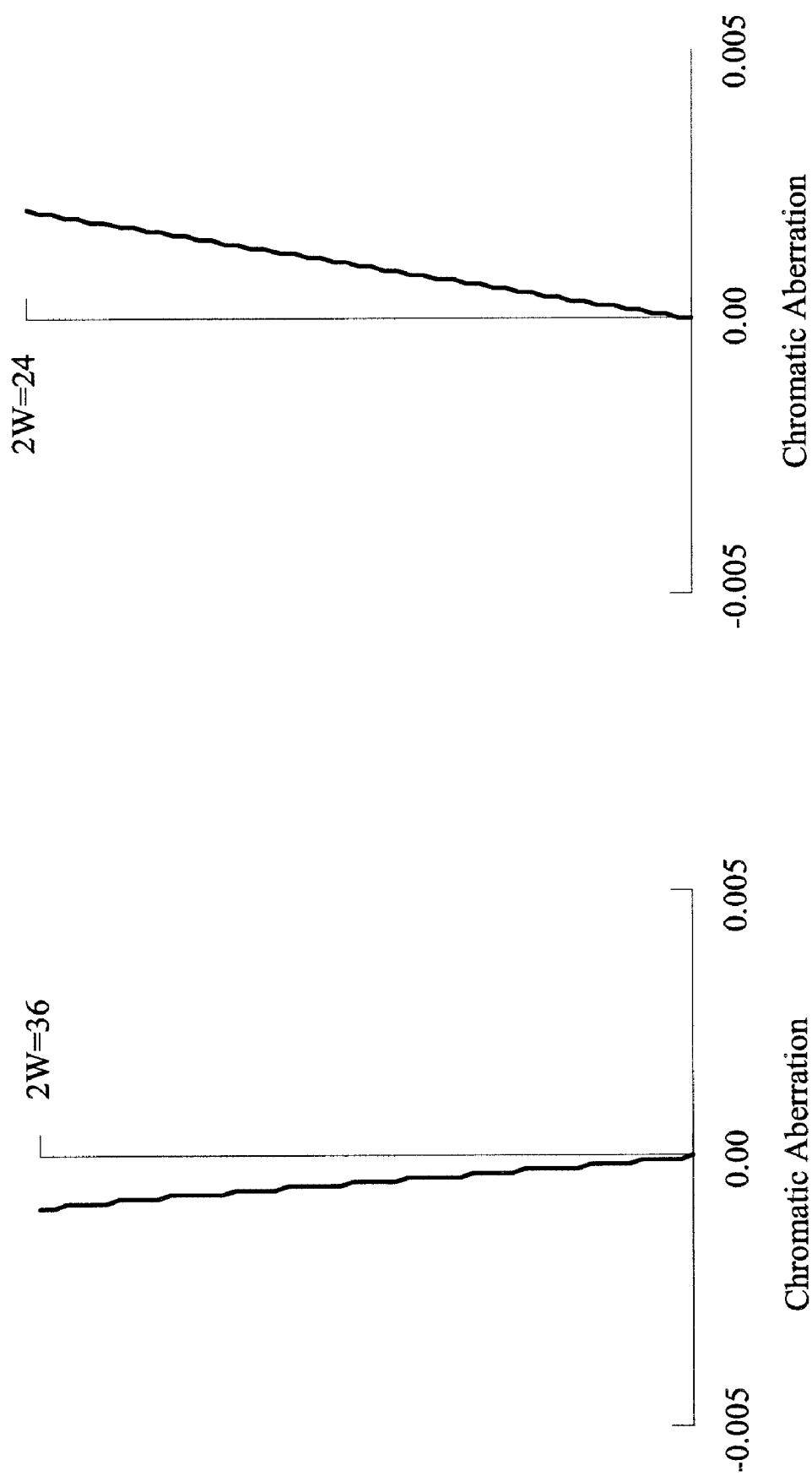

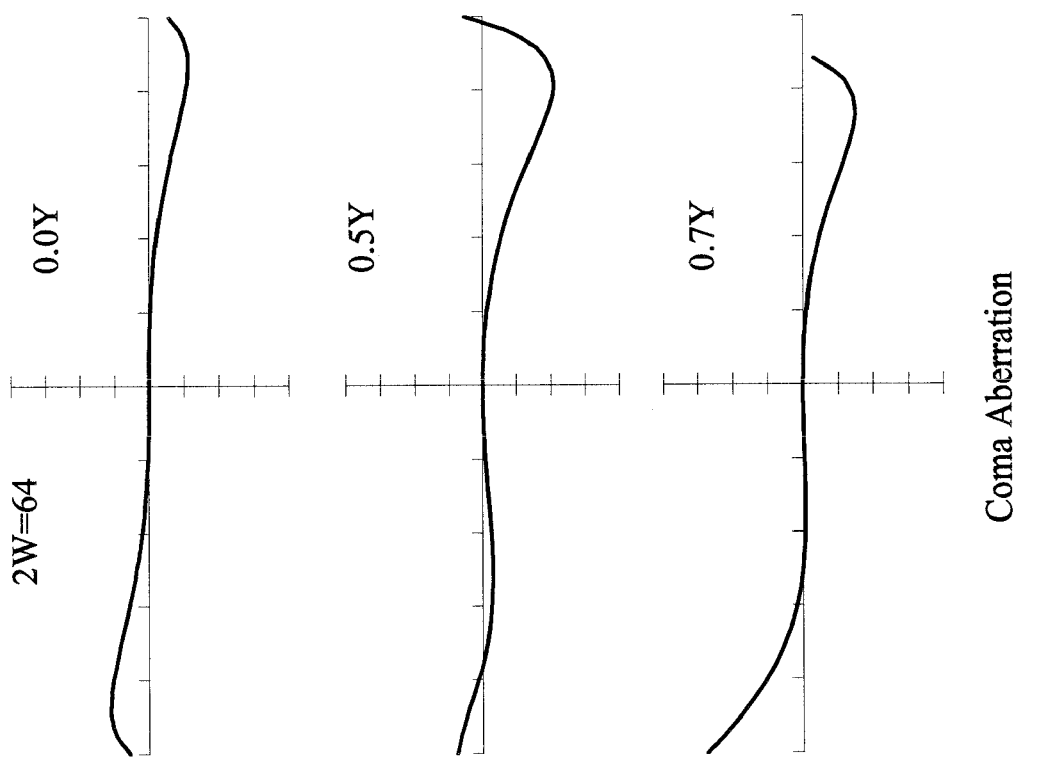

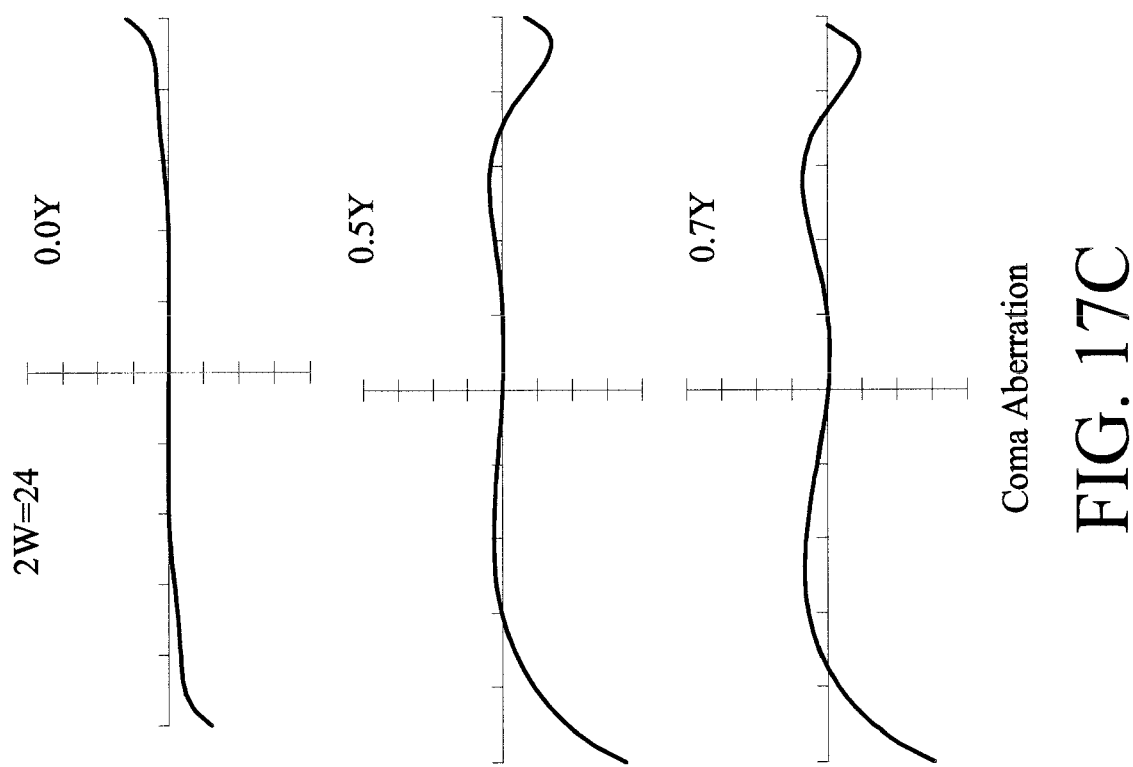
FIG. 17C Coma Aberration

ZOOM LENS DEVICE

FIELD OF THE INVENTION

The present invention generally relates to a zoom lens device, and in particular to a miniaturized zoom lens device having high image resolution, which is applicable to both digital and non-digital imaging devices, such as cameras.

BACKGROUND OF THE INVENTION

FIG. 1 of the attached drawings shows the operation principle of an imaging device. When the imaging plane D of the imaging device moves horizontally, the FOV (Field of View) angle A (2w) and the focal length change at the same time, while the image of an object formed on the imaging plane D through a lens system B of the imaging device, which a focal length C, becomes more clear, which makes the object seen closer. Two methods are commonly used to change the FOV angle A. The first method is to alter the focal length of the imaging device, which is the so-called the optical zooming method that is effected by altering the relative position of a zoom lens that constitutes in part the lens system B. The second one is to change the size of the imaging plane D, namely to change the diagonal length of the imaging plane, which is called the digital zooming process.

The optical zooming principle is that the focal length C is changed by moving inner lenses of the lens system B so as to alter the position of the focal point, while the size of the FOV angle A of the lens system B is also changed accordingly thereby zooming in or zooming out the image of the object. When the position of the focal point is altered, the focal length C varies as well. For example, if the focal point is made to move away from the imaging plane D, the focal length C is lengthened while the FOV angle A becomes smaller. Thus, the image of the object within the view scope on the imaging plane D becomes bigger. On the other hand, digital zooming is realized by using an image processor to separately enlarge the image information caught by a sensing unit located in a zone of a sensing component. In digital zooming, the size of the image of one object on the sensing component (equivalent to the imaging plane D) through the lens system B is not changed. Instead, it is realized by intercepting the imaging factors located in a center portion of the sensing component D by software of the camera, and further by enlarging and interpolating by other software to thereby obtain the zoom-in effect.

Among the various imaging lenses currently available in the market, lenses, like Petzval lens, three-lens-type lens and wide-angle lens are commonly used. A Petzval lens usually consists of two separated lens groups with positive focal lengths, and is characterized by its big aperture and small FOV angle A typical three-lens-type lens normally has three single lenses with positive, negative and positive refractive powers respectively. The FOV angle of a three-lens-type lens is bigger than that of the Petzval lens while the aperture is relatively small. The FOV angle of a wide-angle lens exceeds 60° mostly with a symmetric structure having an aperture stop in the center thereof while the other lenses are symmetrically arranged with respect to the aperture stop.

An imaging lens often adopts three groups of optical zoom lenses with advantages of good image resolution and compact-design feasibility. In prior arts, a three-group optical zoom lens normally contains a negative first lens group, a positive second lens group and a negative third lens group. When the zoom lens varies from a short focal length position to a long focal length position, the aperture stop moves towards the object side together with the second lens group, as it is attached to the second lens group which acts as a system of magnification change.

U.S. Pat. No. 7,072,121 discloses such a kind of optical zoom lens. The zoom lens of the US patent includes a positive first lens group, a negative second lens group and a positive third lens group, which are arranged in sequence from an object side to an image side. The second lens group may move along an optical axis so as to change the magnification thereof. The zoom lens satisfies the condition: $3.7<L_T/F_W<5.4$, where $L_T$ represents the distance along the optical axis from the object-side plane of the first lens group to the image plane located at the wide-angle end and FW represents the overall focal length of the zoom lens when it is at the wide-angle end. The image-side plane of the first lens group is concave; the second lens group is a double convex lens; and the object-side plane of the third lens group is concave.

In prior arts, there is also negative-positive-positive three-group optical zoom lens, whose second lens group contains three lenses with an aspheric, first surface. Such a zoom lens only adapts to use in a sensing component with a relatively small size or with a magnification less than three (3), although the image resolution thereof is acceptable. However, if it is used in a sensing component with a relatively big size, the image resolution does not meet the requirement due to a bigger imaging plane. Therefore, the known negative-positive-positive type three-group zoom lens does not perform well when it is used for short-distance photography, and thus it is not usable in photographing an object within 60 mm. Moreover, such prior zoom lens occupies a relatively large amount of space, which makes it impossible to meet the requirement of miniaturization as well.

U.S. Pat. No. 7,075,734 shows a negative-positive-positive type three-group optical zoom lens system providing a magnification of about three (3). A first lens group, a second lens group and a third lens group are arranged in sequence from an object side to an image side. When the zoom lens varies from the wide-angle end to the telephoto end, the first and second lens groups move while the third lens group is fixed so that the distance between the first and second lens groups changes and that of the second and third lens groups increases. The second lens group has four or less than four lenses, among which a diffractive surface is formed on one surface, which is not the one that most approaches the object side, of one of the lenses. The diffractive surface meets the condition: $0.2<C/f_W<2.0$, wherein C is the effective diameter of the diffractive surface and $f_W$ is the focal length of the zoom lens system at the wide-angle end. The diffractive surface is designed to decrease the chromatic aberration, and the flare phenomenon can be reduced as well.

However, preparation of the diffractive surface is complicated and expensive, which not only increases the overall cost of the zoom lens system, but also adversely affects the quality improvement of the produced products. Furthermore, it is more important that such a zoom lens system still cannot overcome the above-mentioned shortcomings of the prior arts. That is, it is not suitable for a sensing component with a relatively big size, and thus it cannot be used to photograph an object located in a distance shorter than 60 mm. Moreover, it also requires a relatively large amount of space to accommodate such a zoom lens system.

Therefore, it is necessary to provide a novel three-group optical zoom lens, which not only meets the requirements of miniaturization and high image resolution, but also can be adopted by a sensing component with a relatively big size to be suitable for short-distance photography.

SUMMARY OF THE INVENTION

An objective of the present invention is to provide a zoom lens device comprising three groups of lens, which in total have seven (7) lenses of which four are resin-made lens having aspheric surfaces and three are glass-made spherical lenses so that the zoom lens device has excellent image resolution with a compact size.

Another objective of the present invention is to provide a zoom lens device that can work with a sensing component having enlarged imaging surface while maintaining excellent imaging resolution.

A further objective of the present invention is to provide a zoom lens device that is effective in taking image in a relative short distance with good resolution.

To accomplish the above objective, in accordance with the present invention, a zoom lens device is provided, comprising, in sequence from an object side to an imaging side, a first lens group having negative refractive power, a second lens group having positive refractive power and a third lens group also having positive refractive power. To change the zoom lens device from a wide-angle condition to a telephoto condition, the second lens group is moved towards the object side while the first lens group moves firstly towards the image side and then towards the object side, so that the distance between the first and second lens groups is shortened. The third lens group only moves for focusing.

In an aspect of the present invention, the first lens group (denoted G1 in the drawings) comprises two lens, respectively referred to as first (L1) and second (L2) lenses, of which the first lens is a negative convex-concave lens having a first, convex surface facing the object side and an opposite second, concave surface facing the image side, the second surface of the first lens being aspheric. The second lens is a positive convex-concave lens, having a third, convex surface facing the object side and a fourth, concave surface facing the image side.

Preferably, the first lens is compound resin lens. If desired, the first lens can be a molded glass lens. The second lens can be a spherical glass lens.

The first lens group has a focal length $f_{G1}$ and the zoom lens device has an overall length $L_W$ for the wide-angle condition, which will be referred to as wide-angle overall length of the zoom lens device. The focal length of the first lens groups and the wide-angle overall length of the zoom length device satisfy the following condition:

$$0.36 \le \left|\frac{f_{G1}}{L_W}\right| \le 0.44$$

In another aspect of the present invention, the second lens group (denoted G2 in the drawings) serves as a magnification change lens group, comprising four lenses which include, from the object side to the imaging side, a third, double-convex lens (L3) having fifth and sixth convex surfaces; a fourth, double-convex lens (L4) having seventh and eighth convex surfaces and a fifth, double-concave lens (L5) having ninth and tenth surfaces, wherein the eighth surface and the ninth surface are cemented together to have the fourth and fifth lenses cemented together as a cemented lens; and a sixth, convex-concave lens (L6) having an eleventh, convex surface facing the object side and an opposite twelfth concave surface.

Preferably, the third and sixth lenses are compound resin lenses. If desired, the third and sixth lenses can be molded glass lenses.

The second lens group contains two aspheric surfaces, which are the surfaces that are closest to the object side and the image side. In other words, the fifth surface of the third lens and the twelfth surface of the sixth lens are aspheric surfaces.

In the second group, the fourth and fifth lenses can be spherical glass lenses.

An aperture stop (denoted ST in the drawings) is arranged in front of the second lens group in the direction toward the object side. That is the stop is arranged in front of the fifth surface of the third lens in the direction toward the object side. In accordance with the present invention, the aperture stop is combined in the second lens group and is thus movable in unison with the second lens group.

In accordance with the present invention, the sixth lens of the second group has a focal length $f_{L6}$ and the second lens group has an overall focal length $f_{G2}$ that satisfy the following condition:

$$2.10 \le \frac{f_{L6}}{f_{G2}} \le 3.20$$

Further, the refractive index of the material that makes the sixth lens, denoted N6, and the coefficient of dispersion (Abbe number) of the sixth lens, denoted V6, satisfy the following conditions, respectively:

$$1.65 \le N6 \le 1.80$$

$$20 \le V6 \le 35$$

The overall length of the second lens group including the aperture stop, denoted $D_{G2}$, that ranges from the aperture stop that is closest to the object side to the twelfth surface of the sixth lens that is closest to the imaging side, and the wide-angle overall length $L_W$ of the zoom lens device satisfy the following condition:

$$0.15 \le \frac{D_{G2}}{L_W} \le 0.23$$

Further, the second lens group has a maximum distance of movement, denoted $MT_{G2}$, when moved between a short focal length and a long focal length, and the zoom lens device has a focal length $f_T$ (which will be referred to as telephoto focal length of the zoom lens device) when the zoom lens device is set at the telephoto condition. And the maximum distance of movement of the second lens group and telephoto focal length of the zoom lens device meet the following condition:

$$0.53 \le \frac{MT_{G2}}{f_T} \le 0.66$$

Further, a minimum distance, denoted $D_{12}$, between the fourth surface of the second lens of the first lens group, which is closest to the imaging side, and the fifth surface of the third lens of the second lens group, which is closest to the object side, and the wide-angle overall length of the zoom lens device satisfy the following condition:

$$0.03 \le \frac{D_{12}}{L_W} \le 0.09$$

The third lens group (denoted G3 in the drawings) is for focusing and comprises a seventh, double-convex plastic lens (L7) having a thirteenth convex surface facing the second lens group and a fourteenth convex surface facing the image side. The seventh lens contains at least one aspheric surface. In other words, at least one of the thirteenth and fourteenth surfaces of the seventh lens is an aspheric surface, while the other one of the two surfaces can be either spherical or aspheric.

Preferably, the seventh lens is a compound resin lens. However, if desired, the seventh lens can be a molded glass lens or a plastic lens.

When the zoom lens is made to focus for short-distance photography, the third lens group is caused to move towards the object side and thus approaching the second lens group so as to reduce the distance between the second and third lens groups. The third lens group has a maximum distance of movement, denoted $FM_{G3}$, in doing focusing, which maximum distance, together with the wide-angle overall length of the zoom lens device, satisfies the following condition:

$$\frac{FM_{G3}}{L_W} \le 0.11$$

Further, the maximum distance of movement of the third lens group, $FM_{G3}$, and the focal length of the third lens group, denoted $f_{G3}$, satisfy the following condition:

$$0.11 \le \left|\frac{FM_{G3}}{f_{G3}}\right| \le 0.24$$

It is also noted that the general equation that defines the aspheric surfaces of the lenses of the zoom lens device is given as follows:

$$D = \frac{CH^2}{1+\sqrt{1-(1+K)C^2H^2}} + E_4H^4 + E_6H^6 + E_8H^8 + E_{10}H^{10} + E_{12}H^{12} + E_{14}H^{14}$$

where $C=1/R$; D represents the distance along the optical axis thereof on the height H to the utmost-convex point of the zoom lens; C is the reciprocal of the curvature radius R; R represents the reference radius of the utmost convex surface of the lens; H represents the vertical height of the incident ray parallel to the optical axis thereof; K represents the conical coefficient; $E_4$, $E_6$, $E_8$, $E_{10}$, $E_{12}$, and $E_{14}$ represent, respectively, the aspheric coefficients of the fourth, sixth, eighth, tenth, twelfth and fourteenth order.

To summarize, the zoom lens device of the present invention consists of three lens groups, namely the first, second and third lens groups, having negative, positive, and positive refractive powers respectively. When the zoom lens device is made to move from the wide-angle condition to the telephoto condition for varying focal point thereof, the second lens group moves in a direction toward the object side and at the same time, the first lens group moves initially toward the image side and then in a reversed direction toward the object side to shorten the distance between the first and second lens groups. The shutter and the aperture stop are located in front of the second lens group and move together with the second lens group. The third lens group only serves to focus.

In order to fulfill the purposes of miniaturization and image resolution, the zoom lens device in accordance with the present invention adopts a negative-positive-positive three-lens-group structure and in addition, the second one of the three lens groups includes four lenses having two aspheric surfaces to help realizing high image resolution, miniaturization, and feasibility of short-distance photography.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 2A and 2B illustrate a zoom lens device in accordance with the present invention at a wide-angle condition and a telephoto condition, respectively;

FIGS. 3A-3C are astigmatism curves of the zoom lens device in accordance with a first embodiment of the present invention respectively located at a wide-angle condition, a medium-angle condition, and a telephoto condition;

FIGS. 4A-4C are distortion curves of the zoom lens device in accordance with the first embodiment of the present invention respectively located at the wide-angle condition, the medium-angle condition, and the telephoto condition;

FIGS. 5A-5C are spherical aberration curves of the zoom lens device in accordance with the first embodiment of the present invention respectively located at the wide-angle condition, the medium-angle condition, and the telephoto condition;

FIGS. 6A-6C are chromatic aberration curves of the zoom lens device in accordance with the first embodiment of the present invention respectively located at the wide-angle condition, the medium-angle condition, and the telephoto condition;

FIGS. 7A-7C are coma aberration curves of the zoom lens device in accordance with the first embodiment of the present invention respectively located at the wide-angle condition, the medium-angle condition, and the telephoto condition;

FIGS. 8A-8C are astigmatism curves of the zoom lens device in accordance with a second embodiment of the present invention respectively located at a wide-angle condition, a medium-angle condition, and a telephoto condition;

FIGS. 9A-9C are distortion curves of the zoom lens device in accordance with the second embodiment of the present invention respectively located the wide-angle condition, the medium-angle condition, and the telephoto condition;

FIGS. 10A-10C are spherical aberration curves of the zoom lens device in accordance with the second embodiment of the present invention respectively located at the wide-angle condition, the medium-angle condition, and the telephoto condition;

FIGS. 11A-11C are chromatic aberration curves of the zoom lens device in accordance with the second embodiment of the present invention respectively located at the wide-angle condition, the medium-angle condition, and the telephoto condition;

FIGS. 13A-13C are astigmatism curves of the zoom lens device in accordance with a third embodiment of the present invention respectively located at the wide-angle condition, the medium-angle condition, and the telephoto condition;

FIGS. 14A-14C are distortion curves of the zoom lens device in accordance with the third embodiment of the present invention respectively located at the wide-angle condition, the medium-angle condition, and the telephoto condition;

FIGS. 15A-15C are spherical aberration curves of the zoom lens device in accordance with the third embodiment of the present invention respectively located at the wide-angle condition, the medium-angle condition, and the telephoto condition;

FIGS. 16A-16C are chromatic aberration curves of the zoom lens device in accordance with the third embodiment of the present invention respectively located at the wide-angle condition, the medium-angle condition, and the telephoto condition; and FIGS. 17A-17C are coma aberration curves of the zoom lens device in accordance with the third embodiment of the present invention respectively located at the wide-angle condition, the medium-angle condition, and the telephoto condition.

DETAILED DESCRIPTION OF THE PREFERRED EMBODIMENTS

Figure 1:
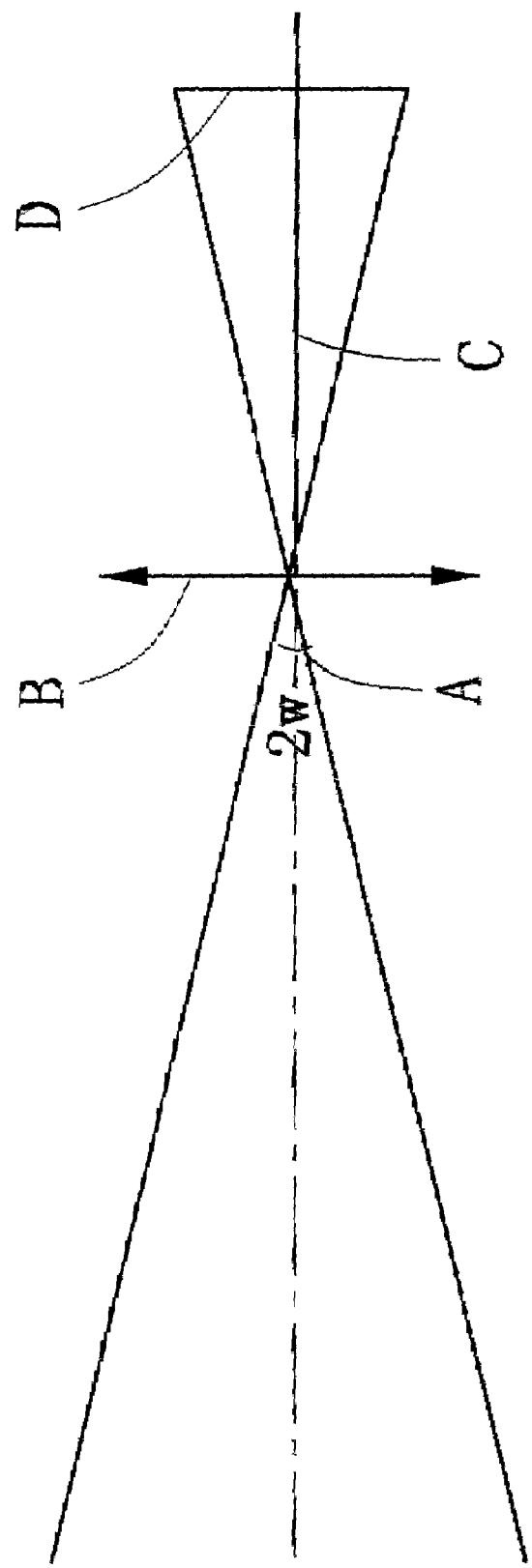
FIG. 1 is a schematic view illustrating the known principle of imaging devices.
Figure 2A:
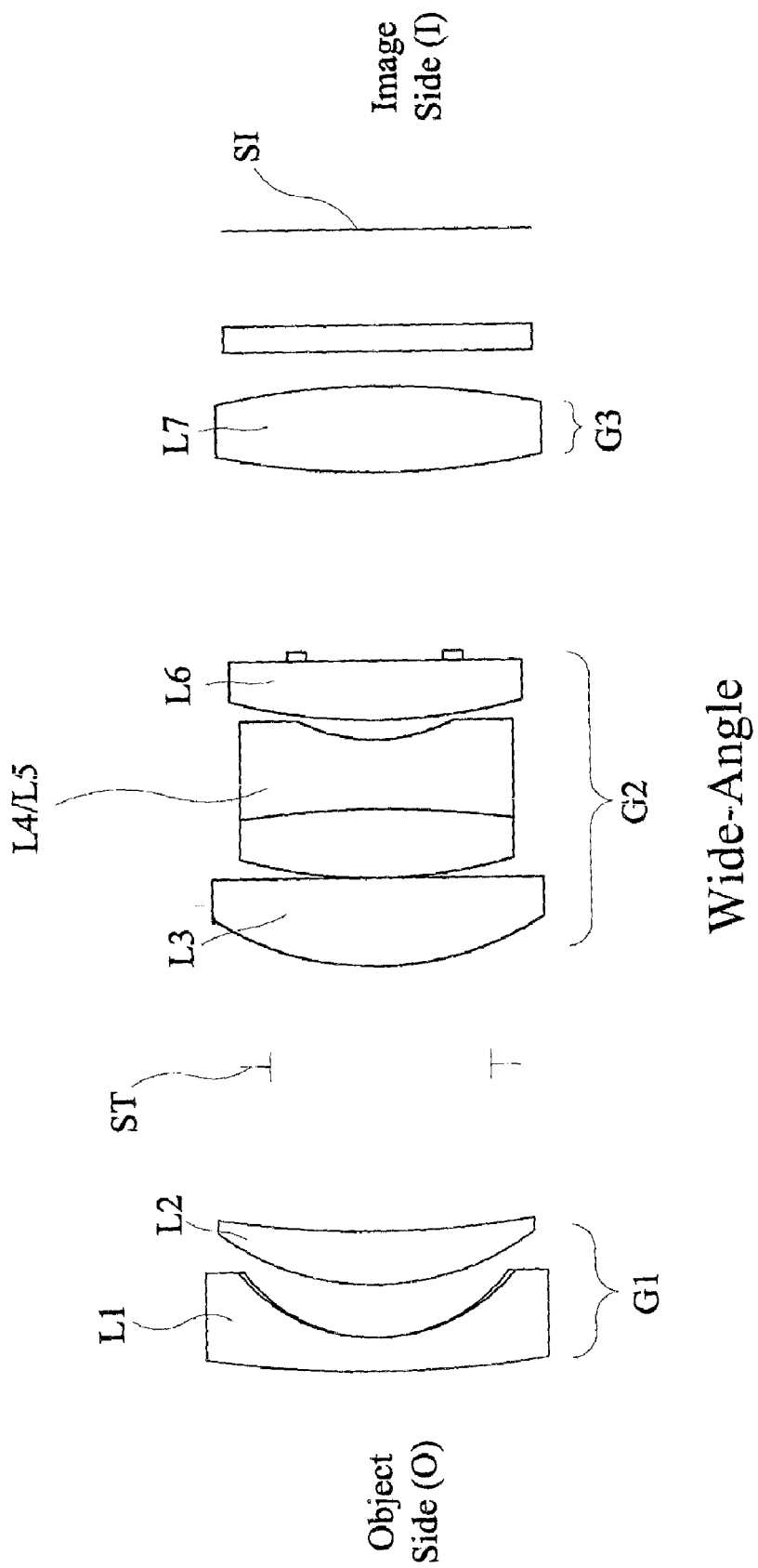

With reference to the drawings, and in particular to FIGS. 2A and 2B, a zoom lens device constructed in accordance with the present invention comprises a first lens group G1 having a negative refractive power, a second lens group G2 having a positive refractive power, and a third lens group G3 having a positive refractive power, which are arranged in sequence from an object side O to an image side I.

The first lens group G1 comprises two lenses, the first lens L1 and the second lens L2. The first lens L1 is a negative convex-concave lens and the second lens L2 is a positive convex-concave lens with a positive refractive power. The convex surfaces of both the first and second lenses L1, L2 face the object side. The focal length $f_{G1}$ of the first lens group G1 and the wide-angle overall length $L_W$ of the zoom lens device satisfy the following condition:

$$0.36 \leq \left|\frac{f_{G1}}{L_W}\right| \leq 0.44$$

In an embodiment, the first lens L1 of the first lens group G1 is a molded glass lens having a first convex surface facing the object side and an opposite second concave surface facing the image side, which is an aspheric surface. Alternately, the glass-molded first lens L1 itself can be a spherical lens that does not form an aspheric concave surface, and instead, a layer of resin, which forms an aspheric surface, is bonded to the concave surface of the molded glass lens to form a "compound resin lens". Of course, the "spherical" lens itself can be made of other materials, such as plastics, and an aspheric layer is subsequently attached thereto. In this case, the first lens L1 will be referred to as having three surfaces, including the first and second surfaces of the glass-molded lens, and the third surface defined by the resin layer. This definition will be helpful to understand numerical embodiments given hereinafter.

The second lens group G2 serves as a magnification change lens groups and comprises four lenses arranged in turn from the object side O to the image side I: a third lens L3, which is a double-convex compound resin lens, a fourth lens L4 and a fifth lens L5, which are respectively a double-convex lens and a double-concave lens cemented together as a cemented lens, and a sixth lens L6, which is a compound resin lens having a convex surface facing the object side O. An aperture stop ST is arranged in front of a convex surface of the third lens L3 of the second lens group G2, which is closest to the object side O.

The sixth lens L6 of the second lens group G2 has an aspheric surface facing the image side I and closest to the image side I. The third lens L3 also has an aspheric surface facing the object side and closest to the object side. In other words, both the third and sixth lenses have an aspheric surface that is closest to the image side and the object side.

Again, the compound resin lens of third lens L3 is formed by attaching a resin layer that forms an aspheric surface to a molded lens, such as a glass molded lens (or a plastic-molded lens or the equivalents). Or alternatively, the third lens L3 can be molded in such a way that the molded lens itself contains the aspheric surface. This is applicable to the sixth lens L6. It is noted, again, that the third lens L3 and the sixth lens L6 may be referred to as having three surfaces of which the additional surface is defined by the resin layer attached to the lens itself. It is also noted that in the numeral embodiments described hereinafter, the fourth and fifth lenses are considered having only three surfaces, since the opposing surfaces of the two lenses are cemented together and is treated as "one" surface.

The focal length $f_{L6}$ of the sixth lens L6 and the focal length $f_{G2}$ of the second lens group G2 satisfy the following condition:

$$2.10 \leq \frac{f_{L6}}{f_{G2}} \leq 3.20$$

Further, the refractive index of the material that makes the sixth lens, denoted N6, and the coefficient of dispersion (Abbe number) of the sixth lens, denoted V6, satisfy the following conditions, respectively:

$$1.65 \leq N6 \leq 1.80$$

$$20 \leq V6 \leq 35$$

The overall length $D_{G2}$ of the second lens group G2, which is counted from the aperture stop ST closest to the object side O to the last surface of the second lens group G2 closest to the image side I (namely the aspheric surface of the sixth lens L6) and the wide-angle overall length $L_W$ of the zoom lens device satisfy the following condition:

$$0.15 \leq \frac{D_{G2}}{L_W} \leq 0.23$$

When the zoom lens device of the present invention is made to zoom from a short focal length to a long focal length, the maximum distance of movement, $MT_{G2}$, of the second lens group G2 and the telephoto focal length $f_T$ of the zoom lens device satisfy the following condition:

$$0.53 \le \frac{MT_{G2}}{f_T} \le 0.66$$

The minimum distance $D_{12}$ between the last surface of the first lens group G1 (namely the concave surface of the second lens L2), which is closest to the image side I and faces the second lens group G2, and the first surface of the second lens group G2, which is the closest to the object side O, (namely the aspheric surface of the third lens L3) and the wide-angle overall length $L_W$ of the zoom lens device satisfy the following condition:

$$0.03 \le \frac{D_{12}}{L_W} \le 0.09$$

The third lens group G3 comprises a single, seventh lens L7, which is a double-convex compound resin lens. The seventh lens L7 contains two convex surfaces of which at least one is an aspheric surface, such as the surface that faces the image side, namely the last lens surface of the whole zoom lens device counting from the object side toward the image side. The third lens group G3 serves to provide focusing function. When the zoom lens device is used in short-distance photography, to do focusing, the third lens group G3 moves towards the object side O and approaches the second lens group G2 thereby reducing the distance between the second and third lens groups G2, G3. The maximum distance of movement, $FM_{G3}$, of the third lens group G3 in doing focusing satisfies the following condition with respect to the wide-angle overall length $L_W$ of the zoom lens device:

$$\frac{FM_{G3}}{L_W} \le 0.11$$

And, the maximum distance of movement of the third lens group, $FM_{G3}$, and the focal length $f_{G3}$ of the third lens group G3 satisfy the following condition:

$$0.11 \le \left|\frac{FM_{G3}}{f_{G3}}\right| \le 0.24$$

Once again, the compound resin lens of seventh lens L7 is formed by attaching a resin layer that forms an aspheric surface to a molded lens, such as a glass molded lens (or a plastic-molded lens or the equivalents). Or alternatively, the seventh lens L7 can be molded in such a way that the molded lens itself contains the aspheric surface. It is noted, again, that the seventh lens L7 may be referred to as having three surfaces of which the additional surface is defined by the resin layer attached to the lens itself.

Hence, under such conditions, when the zoom lens device of the present invention is used in short-distance photography, objects located at different distances from the zoom lens device can all have clear images on an image plane SI. Thus, a good imaging quality can be assured via the zoom lens device of the present invention and at the same time, miniaturization of the device can be realized easily.

Furthermore, as the second lens group G2 serves as the magnification change lens group, the two aspheric surfaces of the second lens group G2, which are respectively located at the frontmost (closest to the object side) and rearmost (closest to the image side) positions of the second lens group G2, can be used to modify/correct aberrations occurring therefrom. Therefore, during the zooming process of the zoom lens device from a short focal length position to a long focal length position, a good imaging quality can be ensured for all the time and position. Moreover, in short distance photographing, deterioration of aberration can be suppressed by the configuration of the second lens group G2 of the device of the present invention to further ensure good imaging quality.

The third lens group G3 of the present invention is generally for focusing to ensure that an object located at any feasible distances from the zoom lens device can form a clear image on the image plane SI. However, when the zoom lens of the present invention is made to zoom/focus from a short focal length position to a long focal length position, only the first and second lens groups G1 and G2 move to realize change of the focal length of the zoom lens device while the third lens group G3 remains still.

The equation that defines the aspheric surfaces of the lenses of the zoom lens device is as follows:

$$D = \frac{CH^2}{1 + \sqrt{1 - (1+K)C^2 H^2}} + E_4 H^4 +$$
$$E_6 H^6 + E_8 H^8 + E_{10} H^{10} + E_{12} H^{12} + E_{14} H^{14}$$

where C=1/R. In the equation, D represents the distance along the optical axis thereof on the height H to the utmost-convex point of the zooming lens; R represents the reference radius of the utmost convex surface of the lens; H represents the vertical height of the incident ray parallel to the optical axis thereof; K represents the conical coefficient; and $E_4$, $E_6$, $E_8$, $E_{10}$, $E_{12}$, and $E_{14}$ represent, respectively, the aspheric coefficients of the fourth, sixth, eighth, tenth, twelfth, and fourteenth order.

As discussed above, the first lens L1 of the first lens group G1 is preferably a compound resin lens, but can be a molded glass lens if desired. The third and sixth lenses L3, L6 of the second lens group G2 are preferably compound resin lenses, but either one or both of them can be replaced by molded glass lens. The seventh lens L7 of the third lens group G3 is preferably a compound resin lens, but can be either a molded glass lens or a plastic lens.

In sum, the zoom lens device in accordance with the present invention comprises, in sequence from the object side O to the image side I, three lens groups G1, G2 and G3, which are of negative, positive and positive refractive power respectively. When the zoom lens device is made to zoom from the wide-angle condition to the telephoto condition, the second lens group G2 moves towards the object side O, while the first lens group G1 moves initially towards the image side I and then in a reversed direction towards the object side O, thereby reducing the distance between the first and second lens groups G1, G2. The aperture stop ST and the shutter are located in front of the second lens group G2 and are moveable in unison with the second lens group G2. The third lens group G3 only moves when the zoom lens device is made to focus.

The zoom lens device of the present invention is further illustrated by three numerical embodiments given hereinafter:

Embodiment I

Figures 4B, 4C:
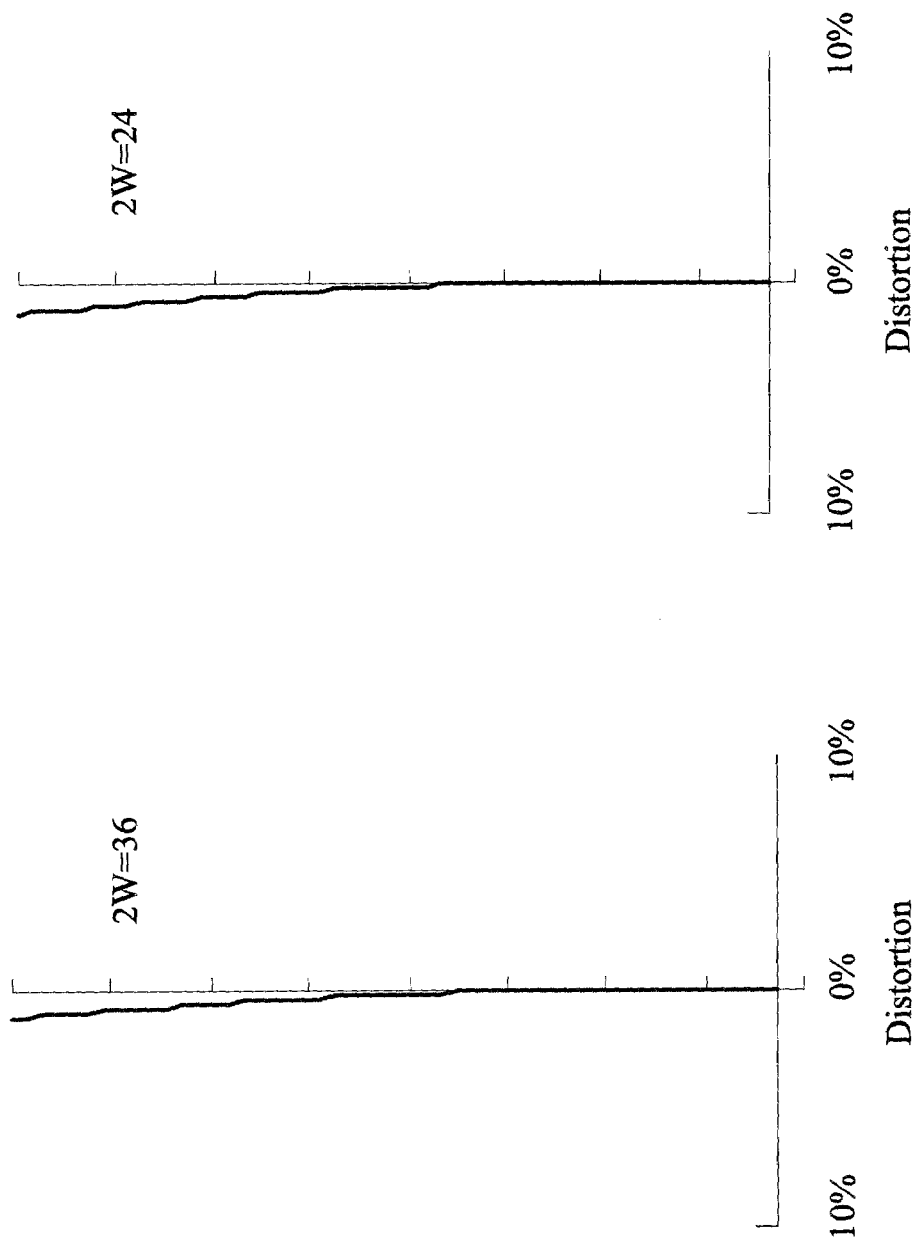

Referring to FIGS. 3A-3C, 4A-4C, 5A-5C, 6A-6C, and 7A-7C and Tables 1-3. FIGS. 3A-3C are astigmatism curves of the zoom lens device in accordance with the first embodiment located respectively at the wide-angle condition, a medium-angle condition, and the telephoto condition. FIGS. 4A-4C are distortion curves of the zoom lens device located respectively at the wide-angle condition, a medium-angle condition and the telephoto condition. FIGS. 5A-5C are spherical aberration curves of the zoom lens device located respectively at the wide-angle condition, a medium-angle condition and the telephoto condition. FIGS. 6A-6C are chromatic aberration curves of the zoom lens device located respectively at the wide-angle condition, a medium-angle condition and the telephoto condition. FIGS. 7A-7C are coma aberration curves of the zoom lens device located respectively at the wide-angle condition, a medium-angle condition and the telephoto condition.

In these drawings, $2w$ denotes the FOV angle; M denotes the meridional plane; S stands for the sagital plane; g represents g-line; d represents d-line; and Y indicates chromatic difference of magnification.

Table 1 shows the construction data of the zoom lens device of the present invention, wherein Fno represents f-number whose value is 2.9 and 4.9 respectively at the wide-angle condition and the telephoto condition. Moreover, $f_{G1}/L_W=0.4$, $f_{L6}/f_{G2}=2.6$, $N6=1.74$, $V6=30.1$, $D_{G2}/L_W=0.2$, $MT_{G2}/f_T=0.58$, $D_{12}/L_W=0.07$, $FM_{G3}/L_W=0.1$, and $FM_{G3}/f_{G3}=0.18$.

Table 2 gives parameters of the four aspheric surfaces of the zoom lens device (namely, the concave surface of the first lens L1, the surface of the third lens L4 that faces the first lens group, the surface of the sixth lens L3 that faces the third lens group, and the surface of the seventh lens L7 that faces the image side, which surfaces are labeled S3, S7, S15, and S18 in Table 1) of the first embodiment, wherein K represents the conical coefficient and $E_4$, $E_6$, $E_8$, $E_{10}$, $E_{12}$, and $E_{14}$ represent, respectively, the aspheric coefficients of the fourth, sixth, eighth, tenth, twelfth, and fourteenth order.

Table 3 gives the values of the distance between the first and third lens groups G1, G3 as well as the distance between the first and second lens groups G1, G2 when the zoom lens device located at the wide-angle condition (W), the medium-angle condition (M) and the telephoto condition (T). In Table 3, D1 represents the distance along the optical axis between the last surface of the first lens group G1, which is closest to the image side I, and the first surface of the third lens group G3, which is closest to the object side O; and D2 represents the distance between the last surface of the first lens group G1, which is closest to the image side I, and the first surface of the second lens group G2, which is closest to the object side O; and f is the focal lengths of the zoom lens device respectively located at the wide-angle condition (W), the medium-angle condition (M) and the telephoto condition (T). It is noted that the first lens L1, the third lens L3, the sixth lens L6, and the seventh lens L7 are "compound resin lens", as indicated by "resin" remark in Table 1. Thus, these lenses have three surfaces, as noted previously.

TABLE 1

(Fno 2.9-4.9)

| Surface | Curvature Ratio: R | Axial Distance: D | Refractive Index: Nd | Abbe Number: Vd | Lens | Lens Group |
|---|---|---|---|---|---|---|
| S1 | 63.134 | 1.1 | 1.81400 | 50.9 | L1 | G1 |
| S2 | 7.461 | 0.05 | 1.5194 | 52.1 | resin | |
| S3 | 6.202 | 2.3 | | | | |
| S4 | 10.4 | 2.0 | 1.783422 | 29.36 | L2 | |
| S5 | 25.681 | D1 | | | | |
| STOP | ∞ | 1.2 | | | ST | Aperture stop |
| S7 | 7.992 | 0.004 | 1.5194 | 52.1 | resin | G2 |
| S8 | 8.464 | 2.2 | 1.726797 | 56.5 | L3 | |
| S9 | −194.588 | 0.1 | | | | |
| S10 | 11.019 | 1.7 | 1.683972 | 65.3 | L4 | |
| S11 | −20.751 | 2.0 | 1.745582 | 30.73 | L5 | |
| S12 | 4.870 | 0.7 | | | | |
| S13 | 15.000 | 1.56 | 1.740769 | 30.1 | L6 | |
| S14 | 1307.3 | 0.04 | 1.5194 | 52.1 | resin | |
| S15 | 24.485 | D2 | | | | |
| S16 | 24.547 | 2.5 | 1.516330 | 64.1 | L7 | G3 |
| S17 | −22.624 | 0.05 | 1.5194 | 52.1 | resin | |
| S18 | −26.066 | 1.0 | | | | |

TABLE 2

| No. | K | $E_4$ | $E_6$ | $E_8$ | $E_{10}$ | $E_{12}$ | $E_{14}$ |
|---|---|---|---|---|---|---|---|
| S3 | −0.880141 | 6.295435E−5 | 5.391418E−6 | −5.009847E−7 | 2.526534E−8 | −6.66860E−10 | 6.776790E−12 |
| S7 | 0 | −2.197872E−4 | −1.212085E−6 | −1.464298E−7 | 2.280597E−9 | 0 | 0 |
| S15 | 0 | 2.522440E−4 | 3.616741E−6 | −7.959675E−7 | 6.168328E−8 | 0 | 0 |
| S18 | 0 | −1.236107E−5 | −5.799973E−6 | 1.996146E−7 | −2.496980E−9 | 0 | 0 |

TABLE 3

| | D1 | D2 |
|---|---|---|
| W (f = 7.54) | 19.077911 | 5.3329430 |
| M (f = 1.98) | 6.7435350 | 11.524372 |
| T (f = 3.0) | 2.3789230 | 17.691800 |

Embodiment II

Figure 8B:
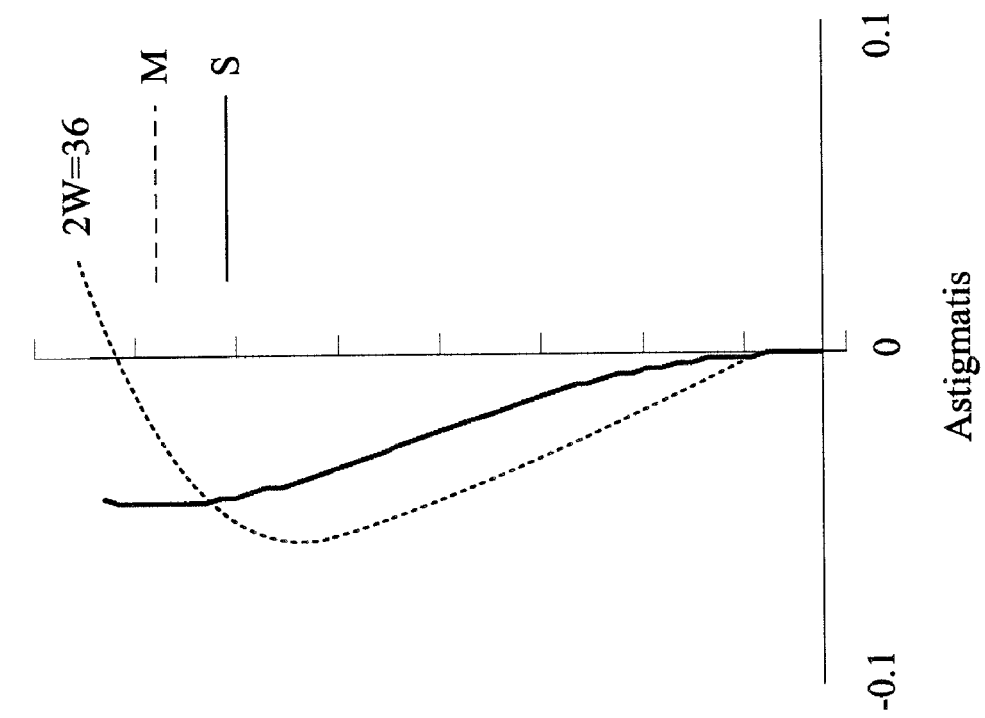
Figure 8A:
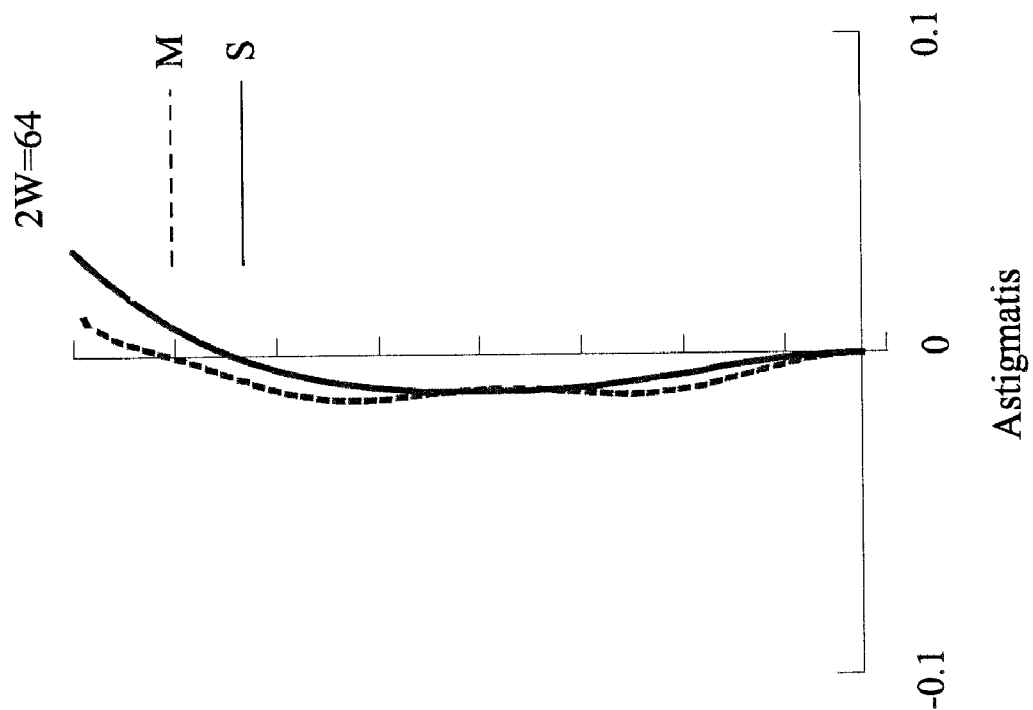
Figures 8C, 9A:
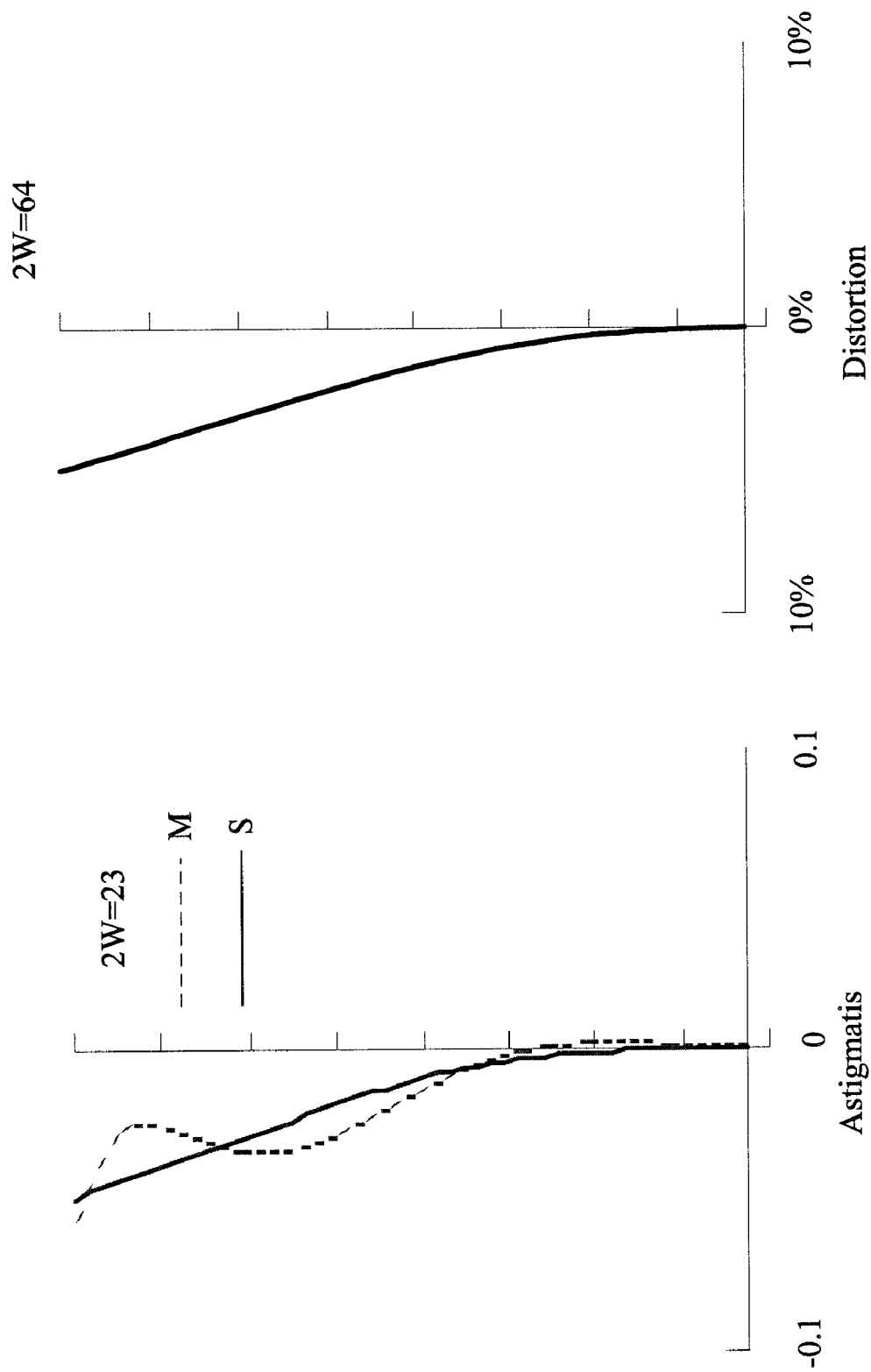
Figures 11B, 11C:
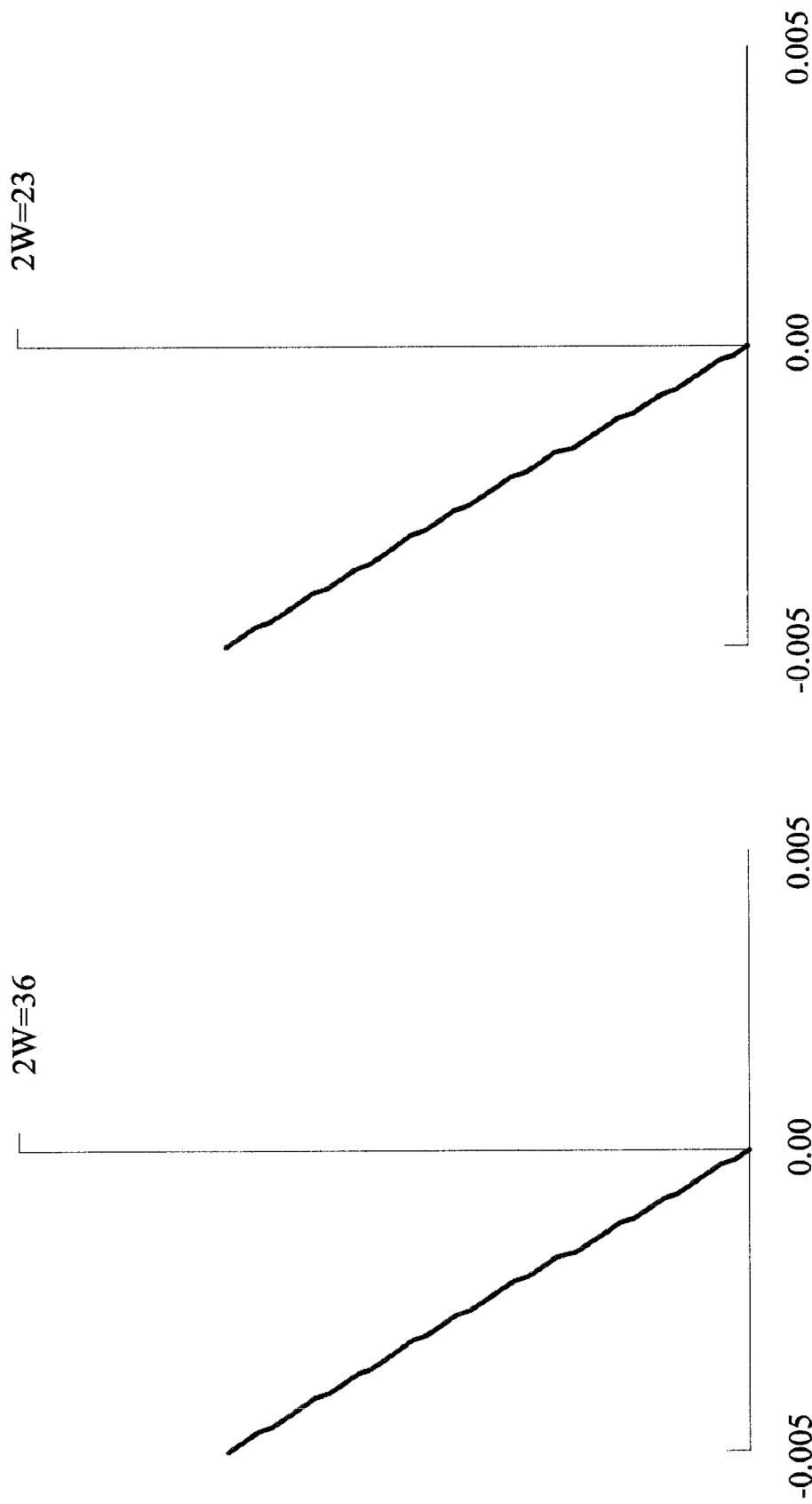
Figure 12A:
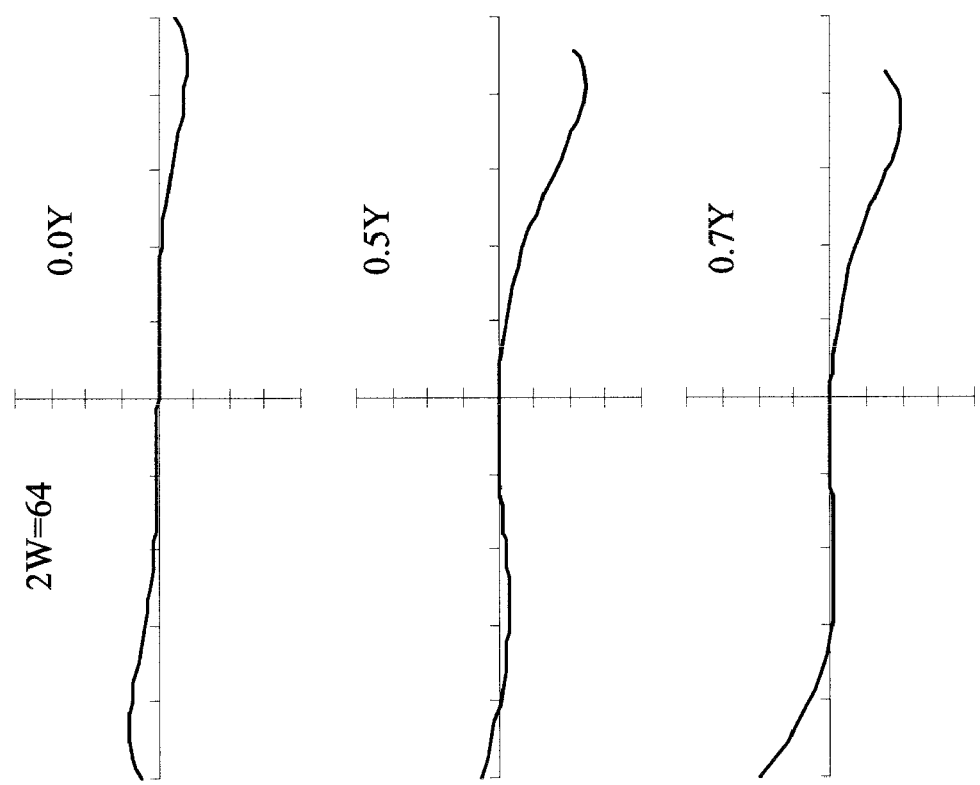
FIGS. 12A-12C are coma aberration curves of the zoom lens device in accordance with the second embodiment of the present invention respectively located at the wide-angle condition, the medium-angle condition, and the telephoto condition.
Figure 12B:
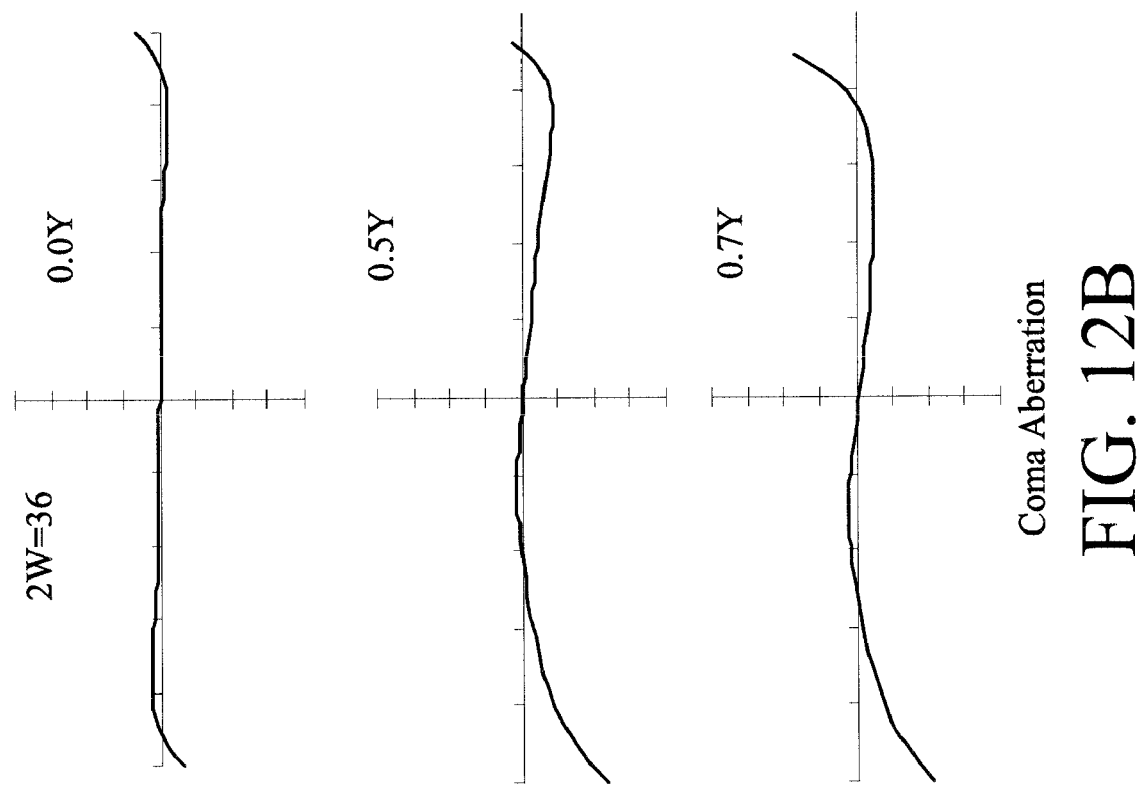
Figure 12C:
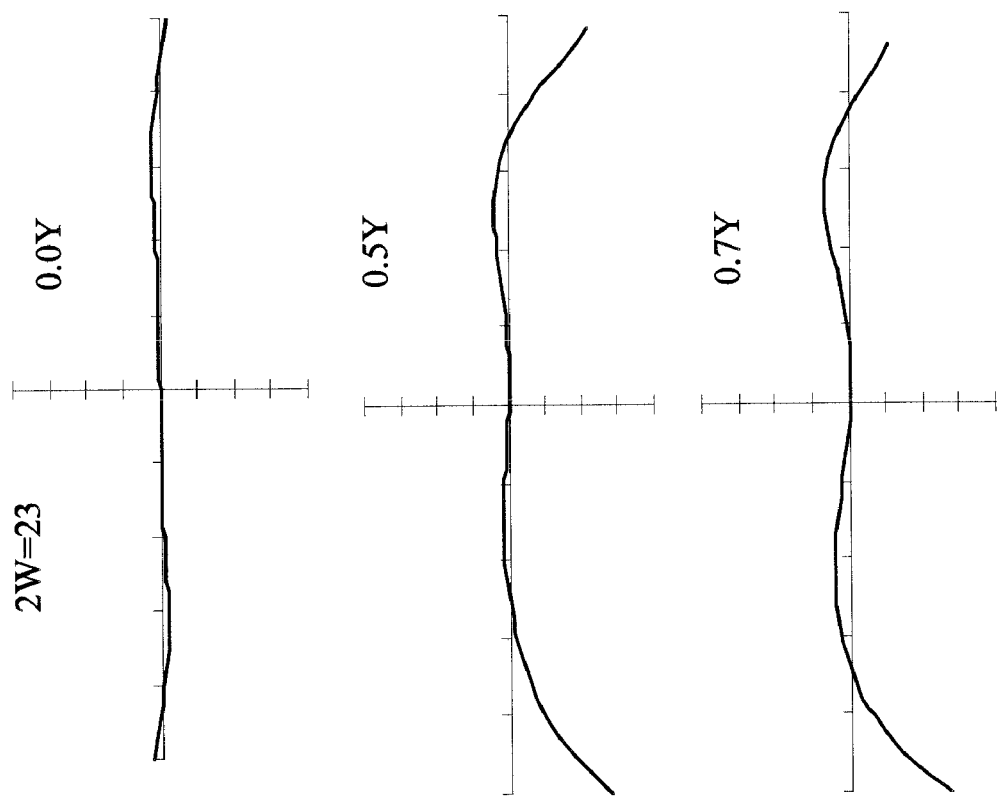

Referring to FIGS. 8A-8C, 9A-9C, 10A-10C, 11A-11C, and 12A-12C, and Tables 4-6. FIGS. 8A-8C are astigmatism curves of the zoom lens device in accordance with the second embodiment located respectively at the wide-angle condition, the medium-angle condition, and the telephoto condition. FIGS. 9A-9C are distortion curves of the zoom lens device located respectively at the wide-angle condition, the medium-angle condition, and the telephoto condition. FIGS. 10A-10C are spherical aberration curves of the zoom lens device located respectively at the wide-angle condition, the medium-angle condition, and the telephoto condition. FIGS. 11A-11C are chromatic aberration curves of the zoom lens device located respectively at the wide-angle condition, a medium-angle condition and the telephoto condition. FIGS. 12A-12C are coma aberration curves of the zoom lens device located respectively at the wide-angle condition, a medium-angle condition and the telephoto condition.

Table 4 shows the construction data of the zoom lens device in accordance with the second embodiment of the present invention. In the table, Fno represents f-number whose value is 2.8 and 4.9 respectively the wide-angle condition and the telephoto condition. Moreover, $f_{G1}/L_W=0.4$, $f_{L6}/f_{G2}=3.1$, N6=1.69, V6=31.1, $D_{G2}/L_W=0.18$, $MT_{G2}/f_T=0.63$, $D_{12}/L_W=0.05$, $FM_{G3}/L_W=0.1$, and $FM_{G3}/f_{G3}=0.18$.

Table 5 gives parameters of the four aspheric surfaces of the zoom lens device in the second embodiment, which surfaces are labeled S2, S6, S12, and S14 in Table 4. Table 6 gives the values of the distance D1 between the first lens group G1 and the third lens group G3 and the distance D2 between the first lens group G1 and the second lens group G2.

It is noted that, different from Embodiment I, none of the lens in Embodiment II is "compound resin" lens. In other words, all the lens in Embodiment II have two surfaces only, as is illustrated in Table 4.

TABLE 4

(Fno 2.8-4.9)

| Surface | Curvature Ratio: R | Axial Distance: D | Refractive Index: Nd | Abbe Number: Vd | Lens | Lens Group |
|---|---|---|---|---|---|---|
| S1 | 125.923 | 1.2 | 1.743198 | 49.3 | L1 | G1 |
| S2 | 6.304 | 2.2 | | | | |
| S3 | 10.352 | 2.0 | 1.743588 | 28.38 | L2 | |
| S4 | 29.48 | D1 | | | | |
| STOP | ∞ | 0 | | | ST | |
| S6 | 7.997 | 2.24 | 1.693501 | 53.2 | L3 | G2 |
| S7 | −164.661 | 0.1 | | | | |
| S8 | 11.026 | 1.7 | 1.755992 | 59.23 | L4 | |
| S9 | −15.807 | 2.0 | 1.765739 | 32.23 | L5 | |
| S10 | 4.857 | 0.7 | | | | |
| S11 | 15.501 | 1.6 | 1.688930 | 31.1 | L6 | |
| S12 | 33.011 | D2 | | | | |
| S13 | 27.134 | 2.5 | 1.589130 | 61.2 | L7 | G3 |
| S14 | −32.748 | 1.0 | | | | |

TABLE 5

| No. | K | $E_4$ | $E_6$ | $E_8$ | $E_{10}$ | $E_{12}$ | $E_{14}$ |
|---|---|---|---|---|---|---|---|
| S2 | −0.723885 | 6.4931864E−5 | 4.0945774E−6 | −2.989721E−7 | 1.3656167E−8 | −3.295231E−10 | 3.2073987E−12 |
| S6 | 0 | −1.784709E−4 | −9.150737E−7 | 1.189172E−7 | 1.7494424E−9 | 0 | 0 |
| S12 | 0 | 2.0927394E−4 | 1.2052842E−5 | −1.653320E−6 | 1.4070851E−7 | 0 | 0 |
| S14 | 0 | −3.150509E−6 | −6.912289E−6 | 2.825945E−7 | −4.364480E−9 | 0 | 0 |

TABLE 6

| | D1 | D2 |
|---|---|---|
| W (f = 7.52) | 20.277911 | 5.3329430 |
| M (f = 14.39) | 6.7435350 | 11.524372 |
| T (f = 21.43) | 2.2789230 | 17.841800 |

Embodiment III

Figures 13A, 13B:
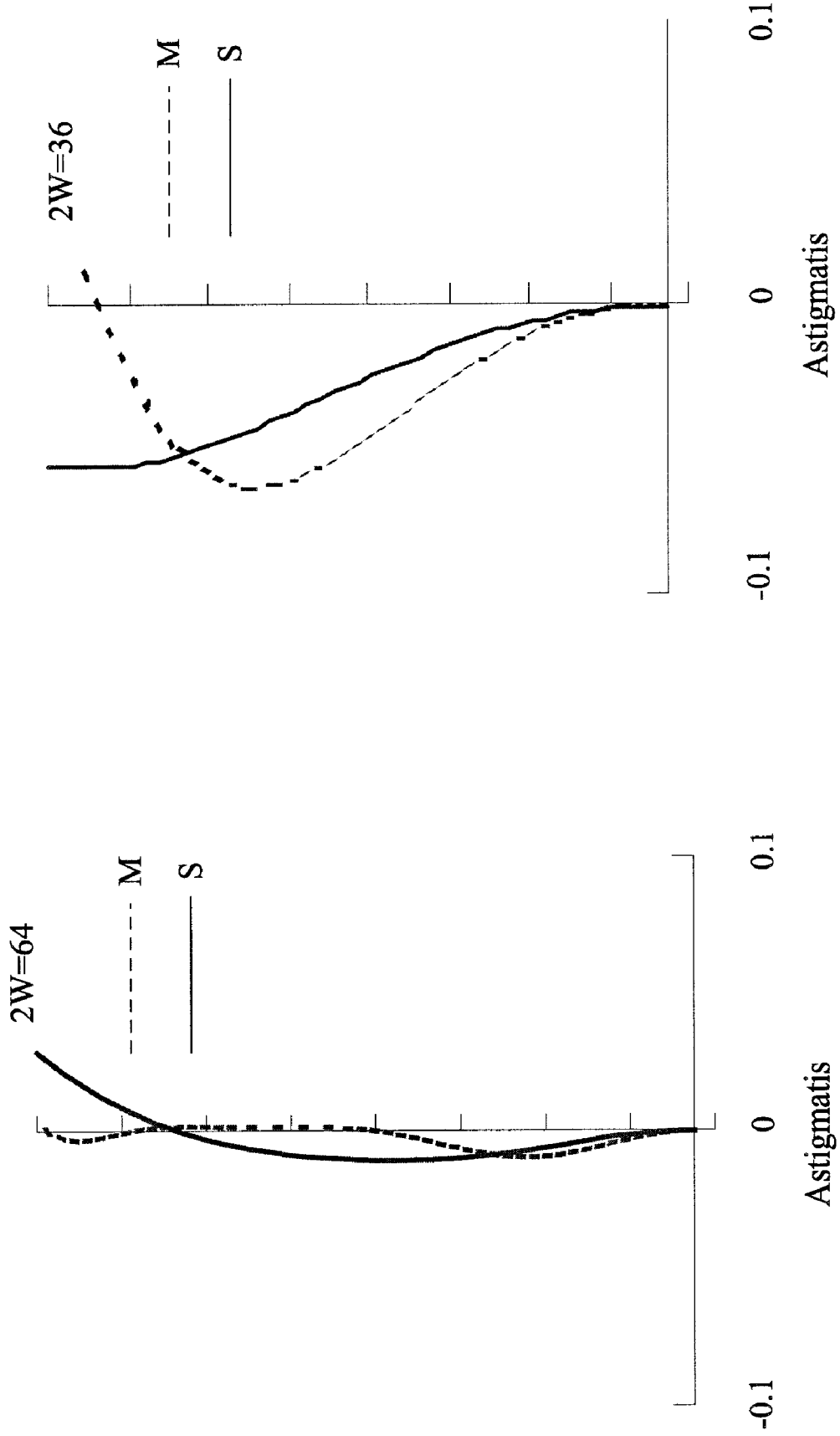
Figures 15A, 15B:
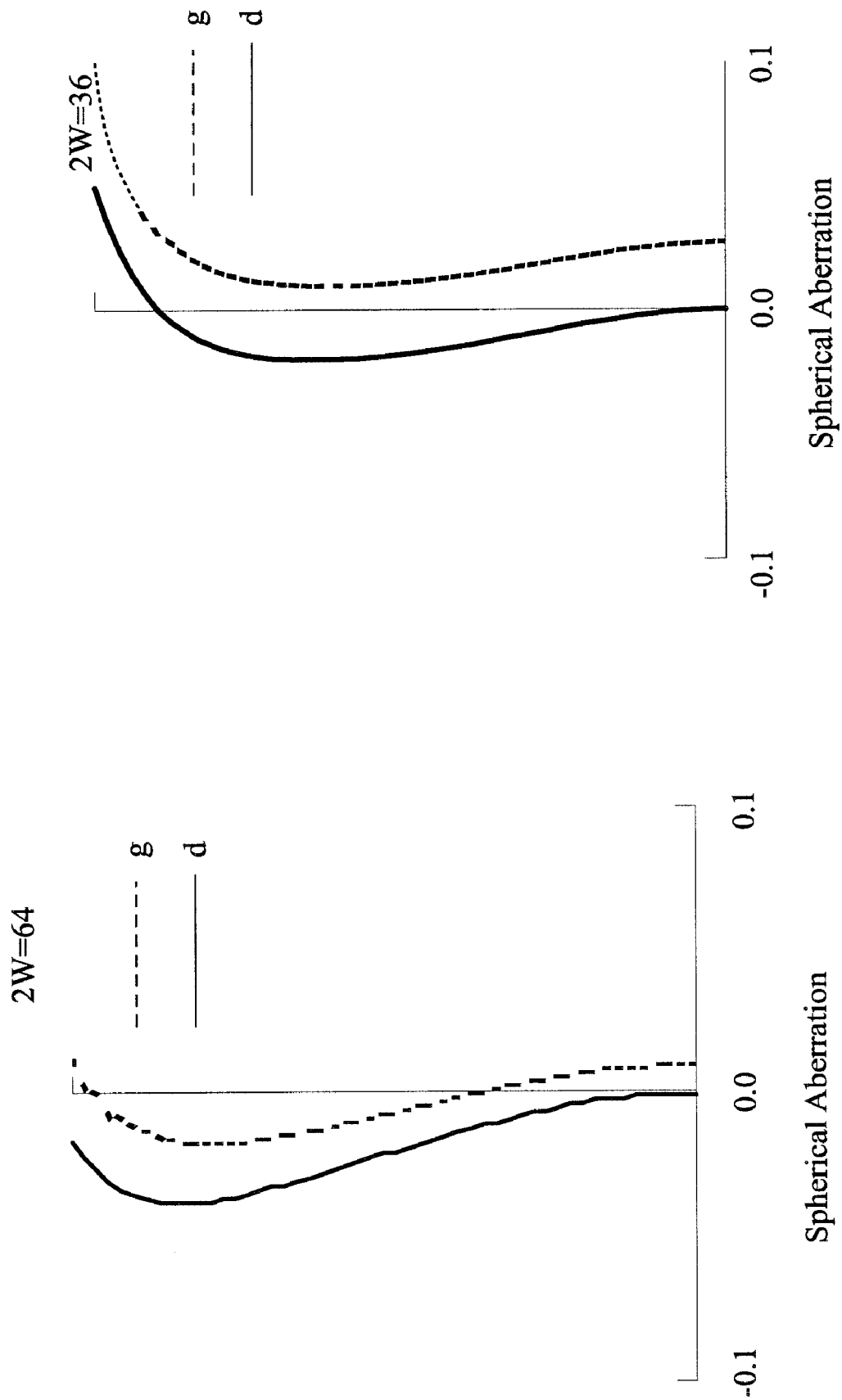
Figure 17B:
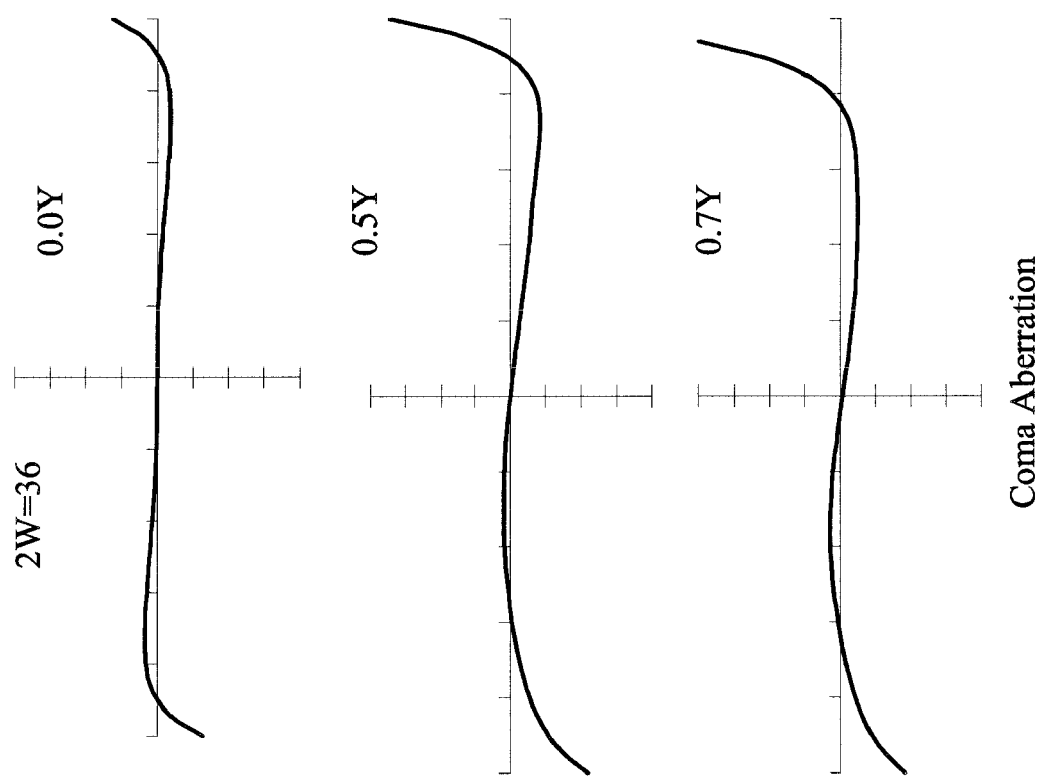

Referring to FIGS. 13A-13C, 14A-14C, 15A-15C, 16A-16C, and 17A-17C, and Table 7-9. FIGS. 13A-13C are astigmatism curves of the zoom lens device in accordance with the third embodiment located respectively at the wide-angle condition, the medium-angle condition, and the telephoto condition. FIGS. 14A-14C are distortion curves of the zoom lens device located respectively at the wide-angle condition, a medium-angle condition and the telephoto condition. FIGS. 15A-15C are spherical aberration curves of the zoom lens device located respectively at the wide-angle condition, a medium-angle condition and the telephoto condition. FIGS. 16A-16C are chromatic aberration curves of the zoom lens device located respectively at the wide-angle condition, a medium-angle condition and the telephoto condition. FIGS. 17A-17C are coma aberration curves of the zoom lens device located respectively at the wide-angle condition, a medium-angle condition and the telephoto condition.

Table 7 shows the construction data of the zoom lens device in accordance with the third embodiment of the present invention. In the table, Fno represents f-number whose value is 2.8 and 4.8 respectively at the wide-angle condition and the telephoto condition thereof. Moreover, $f_{G1}/L_W=0.4$, $f_{L6}/f_{G2}=3.1$, N6=1.69, V6=31.1, $D_{G2}/L_W=0.18$, $MT_{G2}/f_T=0.59$, $D_{12}/L_W=0.07$, $FM_{G3}/L_W=0.09$, and $FM_{G3}/f_{G3}=0.17$.

Table 8 gives parameters of the four aspheric surfaces S2, S6, S13, and S15 of the zoom lens device of the third embodiment. Table 9 gives the values of the distance D1 between the first lens group G1 and the third lens group G3 as well as the distance D2 between the first lens group G1 and the second lens group G2.

It is noted from Table 7 that only the third lens L3 is a "compound resin" lens, as is indicated by "resin" remark shown in Table 7. Thus, the third lens L3 in Embodiment III has three surfaces, namely S6, S7, and S8. The other lenses in this Embodiment are not "compound resin" lenses and thus have only two surfaces.

TABLE 7

(Fno 2.8-4.8)

| Surface | Curvature Ratio: R | Axial Distance: D | Refractive Index: Nd | Abbe Number: Vd | Lens | Lens Group |
|---|---|---|---|---|---|---|
| S1 | 250.702 | 1.2 | 1.693501 | 53.2 | L1 | G1 |
| S2 | 6.124 | 2.2 | | | | |

TABLE 7-continued (Fno 2.8-4.8)

| Surface | Curvature Ratio: R | Axial Distance: D | Refractive Index: Nd | Abbe Number: Vd | Lens | Lens Group |
|---|---|---|---|---|---|---|
| S3 | 10.132 | 2.0 | 1.701116 | 30.09 | L2 | |
| S4 | 30.253 | D1 | | | | |
| STO | ∞ | 1.0 | | | ST | |
| S6 | 8.050 | 0.004 | 1.5194 | 52.1 | L3 | G2 |
| S7 | 8.645 | 2.2 | 1.691036 | 75.01 | resin | |
| S8 | −212.870 | 0.1 | | | | |
| S9 | 10.841 | 1.7 | 1.759149 | 74.99 | L4 | |
| S10 | 45.428 | 2.0 | 1.762550 | 31.41 | L5 | |

TABLE 7-continued (Fno 2.8-4.8)

| Surface | Curvature Ratio: R | Axial Distance: D | Refractive Index: Nd | Abbe Number: Vd | Lens | Lens Group |
|---|---|---|---|---|---|---|
| S11 | 4.950 | 0.7 | | | | |
| S12 | 17.000 | 1.60 | 1.688930 | 31.1 | L6 | |
| S13 | 40.265 | D2 | | | | |
| S14 | 25.146 | 2.5 | 1.516330 | 64.1 | L7 | G3 |
| S15 | −27.752 | 1.0 | | | | |

TABLE 8

| No. | K | $E_4$ | $E_6$ | $E_8$ | $E_{10}$ | $E_{12}$ | $E_{14}$ |
|---|---|---|---|---|---|---|---|
| S2 | −0.725628 | 6.3579801E−5 | 4.2978347E−6 | −3.089668E−7 | 1.3626687E−8 | −3.2601012E−10 | 3.200318E−12 |
| S6 | 0 | −2.130411E−4 | −2.813394E−6 | 6.7795436E−8 | −7.201768E−9 | 0 | 0 |
| S13 | 0 | 2.0677819E−4 | 2.055404E−5 | −3.144532E−6 | 2.333727E−7 | 0 | 0 |
| S15 | 0 | −1.14539E−5 | −7.474764E−6 | 3.201780E−7 | −5.081182E−9 | 0 | 0 |

TABLE 9

| | D1 | D2 |
|---|---|---|
| W (f = 7.52) | 19.277911 | 5.3329430 |
| M (f = 14.29) | 6.9435350 | 11.524372 |
| T (f = 21.62) | 2.0789230 | 17.841800 |

Table 10 shows the values of the focal length $f_{G1}$ and the overall length $L_W$ of the zoom lens device of the present invention, the focal length $f_{L6}$ of the lens L6, the focal length $f_{G2}$ of the second lens group G2, the glass refractive index N6 and the dispersion parameter V6 of the lens L6, the overall length $D_{G2}$ of the second lens group G2 from the aperture stop ST closest to the object side O to the surface S15 closest to the image side I, the maximum movable distance $MT_{G2}$ of the second lens group G2 from a short focal length position to a long focal length position, the focal length $f_T$ of the zoom lens device at the telephoto condition, the minimum distance $D_{12}$ between the surface S5 of the first lens group G1, which is closest to the image side I, and the surface S7 of the second lens group G2, which is closest to the object side O, and the maximum movable distance $FM_{G3}$ of the third lens group G3 when the zoom lens device is made to focus.

TABLE 10

| items | $L_W$ | $D_{G2}$ | $MT_{G2}$ | $FM_{G3}$ | $f_T$ | $f_{G1}$ | $f_{G2}$ | $f_{G3}$ | $f_{L6}$ | N6 | V6 | $D_{12}$ |
|---|---|---|---|---|---|---|---|---|---|---|---|---|
| Embodiment 1 | 46.5 | 9.54 | 12.4 | 4.6 | 21.2 | −18.5 | 13.3 | 25.6 | 34.5 | 1.74 | 30.1 | 3.6 |
| Embodiment 2 | 46.5 | 8.34 | 14.3 | 4.5 | 22.6 | −18.4 | 13.2 | 25.6 | 40.9 | 1.69 | 31.1 | 2.3 |
| embodiment 3 | 46.5 | 8.54 | 12.7 | 4.4 | 21.6 | −18.6 | 13.3 | 26.0 | 41.5 | 1.69 | 31.1 | 3.1 |

In accordance with the present invention, three spherical glass lenses and four resin compounded lenses are used to replace the glass molded lenses employed in the known device. This effectively decrease the manufacturing costs of the zoom lens device. The zoom lens device of the present invention adopts a negative-positive-positive structure as well as the four lenses with two aspheric surfaces in the second lens group G2. Thus, requirements including high image resolution, miniaturization and feasibility for a short-distance photography can be easily satisfied.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A zoom lens device comprising, from an object side to an image side:

a negative first lens group;

a positive second lens group; and a positive third lens group;

with no intervening lenses between the first second and third lens groups; and wherein the second lens group comprises four lenses having a closest-to-object-side lens having an object-side surface that is aspheric and a closest-to-image-side lens having an image-side surface that is aspheric;

wherein the second lens group has an overall focal length $f_{G2}$ and the closest-to-image-side lens of the second lens group has a focus length $f_{L6}$, which satisfy the following condition:

$$2.10 \leq \frac{f_{L6}}{f_{G2}} \leq 3.20; \quad \text{and}$$

wherein when the zoom lens device varies from a wide-angle condition to a telephoto condition, the second lens group moves towards the object side while the first lens group moves firstly towards the imaging side and then towards the object side, so that the distance between the first and second lens groups is shortened.

2. The zoom lens device as claimed in claim 1, wherein the first lens group comprises a first lens, which is a negative convex-concave lens, and a second lens, which is a positive convex-concave lens, both the first and second lenses having a convex surface facing the object side and a concave surface facing the image side.

3. The zoom lens device as claimed in claim 2, wherein the first lens group has an overall focal length $f_{G1}$, which satisfies the following condition:

$$0.36 \leq \left|\frac{f_{G1}}{L_W}\right| \leq 0.44$$

wherein $L_W$ represents the overall length of the zoom lens device for the wide-angle condition.

4. The zoom lens device as claimed in claim 1, wherein the closest-to-object-side lens of the second lens group comprises a double-convex lens having the aspheric object-side surface that is convex and wherein the closest-to-image-side lens of the second lens group comprises a convex-concave lens having the aspheric image-side surface that is concave.

5. The zoom lens device as claimed in claim 4, wherein the second group further comprises two intermediate lenses that comprise a double-convex lens and a double-concave lens, the two intermediate lenses being cemented together.

6. The zoom lens device as claimed in claim 1 further comprising an aperture stop between the first lens group and the closest-to-object-side lens of the second lens group and being movable in unison with the second lens group.

7. The zoom lens device as claimed in claim 1, wherein the closest-to-image-side lens of the second lens group satisfies the conditions:

1.65≦N6≦1.80 and

20≦V6≦35 wherein N6 and V6 respectively denotes refractive index and dispersion parameter of the closest-to-image-side lens of the second lens group.

8. The zoom lens device as claimed in claim 6, wherein the second lens group has an overall length $D_{G2}$ measured from the aperture stop to the image-side surface of the closest-to-image-side lens, the overall length $D_{G2}$ satisfying the condition:

$$0.15 \leq \frac{D_{G2}}{L_W} \leq 0.23$$

wherein $L_W$ represents the overall length of the zoom lens device for the wide-angle condition.

9. The zoom lens device as claimed in claim 1, wherein the second lens group has a maximum distance of movement $MT_{G2}$ for varying from a short focal length position to a long focal length position, which satisfies the following condition:

$$0.53 \leq \frac{MT_{G2}}{f_T} \leq 0.66$$

wherein $f_T$ denotes telephoto focal length of the zoom lens device at the telephoto condition.

10. The zoom lens device as claimed in claim 1, wherein the first lens group has a surface that is closest to the image side and wherein a minimum distance D12 between the surface of the first lens group and the object-side surface of the closest-to-object-side lens of the second lens group satisfies the following condition:

$$0.03 \leq \frac{D_{12}}{L_W} \leq 0.09$$

wherein $L_W$ represents the overall length of the zoom lens device for the wide-angle condition.

11. The zoom lens device as claimed in claim 1, wherein the third lens group is used to focus and comprises a double-convex lens having at least one aspheric surface.

12. The zoom lens device as claimed in claim 11, wherein when the zoom lens device is made to focus for short-distance photograph, the third lens group moves towards the object side so as to approach the second lens group, thereby reducing distance between the second and third lens groups.

13. The zoom lens device as claimed in claim 1, wherein the third lens group has a maximum distance of movement $FM_{G3}$ satisfying the following condition:

$$\frac{FM_{G3}}{L_W} \leq 0.11 \text{ and}$$

$$0.11 \leq \left|\frac{FM_{G3}}{f_{G3}}\right| \leq 0.24$$

wherein $L_W$ represents the overall length of the zoom lens device for the wide-angle condition and $f_{G3}$ denotes an overall focal length of the third lens group.

14. The zoom lens device as claimed in claim 1, wherein the first lens group comprises a first lens that is a glass molded lens having an aspheric surface.

15. The zoom lens device as claimed in claim 1, wherein the first lens group comprises a first lens that has an aspheric surface formed by a resin layer attached to the first lens.

16. The zoom lens device as claimed in claim 1, wherein the closest-to-image-side lens and the closest-to-object-side lenses of the second lens group are glass-molded lens each having an aspheric surface.

17. The zoom lens device as claimed in claim 1, wherein the closest-to-image-side lens and the closest-to-object-side lenses of the second lens group each have an aspheric surface formed by a resin layer attached to the lens.

18. The zoom lens device as claimed in claim 1, wherein the third lens group comprises a molded lens having an aspheric surface.

19. The zoom lens device as claimed in claim 1, wherein the third lens group comprises a molded lens having an aspheric surface formed by a resin layer attached to the lens.

* * * * *